US009497787B2

(12) United States Patent
Mostafa et al.

(10) Patent No.: US 9,497,787 B2
(45) Date of Patent: Nov. 15, 2016

(54) METHOD, APPARATUS, AND COMPUTER PROGRAM PRODUCT FOR MANAGING CONCURRENT CONNECTIONS BETWEEN WIRELESS DOCKEE DEVICES IN A WIRELESS DOCKING ENVIRONMENT

(71) Applicant: Nokia Corporation, Espoo (FI)

(72) Inventors: Miraj Mostafa, Tampere (FI); Juhani Huttunen, Veikkola (FI)

(73) Assignee: Nokia Technologies Oy, Espoo (FI)

( * ) Notice: Subject to any disclaimer, the term of this patent is extended or adjusted under 35 U.S.C. 154(b) by 243 days.

(21) Appl. No.: 14/089,369

(22) Filed: Nov. 25, 2013

(65) Prior Publication Data

US 2015/0149679 A1 May 28, 2015

(51) Int. Cl.
G06F 13/00 (2006.01)
H04W 76/02 (2009.01)
G06F 1/16 (2006.01)
H04W 76/06 (2009.01)

(52) U.S. Cl.
CPC .......... H04W 76/021 (2013.01); G06F 1/1632 (2013.01); H04W 76/023 (2013.01); H04W 76/064 (2013.01)

(58) Field of Classification Search
None
See application file for complete search history.

(56) References Cited

U.S. PATENT DOCUMENTS 5,530,702 A   6/1996 Palmer et al.
5,842,210 A  11/1998 Chen et al.
6,757,531 B1  6/2004 Haaramo et al.
6,816,063 B2 11/2004 Kubler et al.
6,888,354 B1  5/2005 Gofman
(Continued)

FOREIGN PATENT DOCUMENTS

EP        1630712       1/2006
WO    WO0067221      11/2000
(Continued)

OTHER PUBLICATIONS

NFC Digital Protocol Candidate Technical Specification, NFC Forum TM, NFCForum-TS-Digital Protocol, Apr. 3, 2009, 186 pp.
(Continued)

Primary Examiner — Henry Tsai
Assistant Examiner — Christopher Bartels
(74) Attorney, Agent, or Firm — Locke Lord LLP

(57) ABSTRACT

Method, apparatus, and computer program product embodiments enable a wireless docking center device to manage one or more wireless and/or wired peripheral devices on behalf multiple wireless dockee devices. An example embodiment of the invention includes receiving, by a wireless docking center device, at least two request messages for peripheral functions from at least two wireless dockee devices, including a first request message for a peripheral function from a first wireless dockee device, and a second request message for a peripheral function from a second wireless dockee device; and allocating, by the wireless docking center device, the requested peripheral function to the first wireless dockee device, based on determining at least a characteristic of the first request message indicates that the first wireless dockee device is entitled to the peripheral function.

15 Claims, 18 Drawing Sheets

(56) References Cited

U.S. PATENT DOCUMENTS

| | | | |
|---|---|---|---|
| 6,892,052 B2 | 5/2005 | Kotola et al. | |
| 7,069,312 B2 | 6/2006 | Kostic et al. | |
| 7,075,412 B1 | 7/2006 | Reynolds et al. | |
| 7,076,270 B2* | 7/2006 | Jaggers et al. | 455/556.1 |
| 7,190,981 B2 | 3/2007 | Cherian | |
| 7,471,200 B2 | 12/2008 | Otranen | |
| 7,519,682 B2 | 4/2009 | Smith et al. | |
| 7,701,958 B2 | 4/2010 | Abrol et al. | |
| 7,775,432 B2 | 8/2010 | Jalkanen et al. | |
| 7,821,399 B2 | 10/2010 | Otranen | |
| 8,019,883 B1* | 9/2011 | Margulis | G06F 1/266 370/450 |
| 8,210,433 B2 | 7/2012 | Jalkanen et al. | |
| 8,254,992 B1 | 8/2012 | Ashenbrenner et al. | |
| 8,271,713 B2* | 9/2012 | Grady et al. | 710/303 |
| 8,699,379 B2* | 4/2014 | Kholaif | H04W 48/20 370/254 |
| 8,805,358 B2* | 8/2014 | Wang | G06Q 10/087 455/414.1 |
| 2001/0045460 A1 | 11/2001 | Reynolds et al. | |
| 2002/0012329 A1 | 1/2002 | Atkinson | |
| 2002/0021809 A1 | 2/2002 | Salo et al. | |
| 2002/0022961 A1 | 2/2002 | Sepanaho | |
| 2002/0023264 A1 | 2/2002 | Aaltonen et al. | |
| 2002/0069406 A1 | 6/2002 | Aaltonen et al. | |
| 2002/0087997 A1 | 7/2002 | Dahlstrom | |
| 2002/0191998 A1 | 12/2002 | Cremon et al. | |
| 2003/0043041 A1 | 3/2003 | Zeps et al. | |
| 2003/0084177 A1 | 5/2003 | Mulligan | |
| 2003/0097304 A1 | 5/2003 | Hunt | |
| 2003/0120745 A1 | 6/2003 | Katagishi et al. | |
| 2003/0134653 A1 | 7/2003 | Sarkkinen et al. | |
| 2004/0117442 A1* | 6/2004 | Thielen | 709/203 |
| 2004/0193676 A1 | 9/2004 | Marks | |
| 2004/0203413 A1 | 10/2004 | Harumoto | |
| 2004/0225199 A1 | 11/2004 | Evanyk et al. | |
| 2006/0003768 A1 | 1/2006 | Chiou | |
| 2006/0215601 A1* | 9/2006 | Vleugels | H04W 28/26 370/328 |
| 2006/0221917 A1* | 10/2006 | McRae | H04W 88/06 370/338 |
| 2006/0258289 A1* | 11/2006 | Dua | G06F 17/30058 455/41.3 |
| 2007/0001853 A1 | 1/2007 | Otranen | |
| 2007/0123316 A1 | 5/2007 | Little | |
| 2007/0168440 A1 | 7/2007 | Cobelens | |
| 2007/0220562 A1* | 9/2007 | Janssen | H04L 67/04 725/81 |
| 2008/0146151 A1 | 6/2008 | Lyu et al. | |
| 2008/0195788 A1 | 8/2008 | Tamir et al. | |
| 2008/0248751 A1 | 10/2008 | Pirzada et al. | |
| 2008/0253331 A1 | 10/2008 | Gupta et al. | |
| 2009/0197604 A1 | 8/2009 | Gupta et al. | |
| 2009/0222659 A1 | 9/2009 | Miyabayashi et al. | |
| 2009/0227282 A1 | 9/2009 | Miyabayashi et al. | |
| 2009/0259612 A1* | 10/2009 | Hanson | H04L 69/32 706/47 |
| 2009/0271519 A1 | 10/2009 | Helvick | |
| 2009/0276439 A1 | 11/2009 | Rosenblatt et al. | |
| 2009/0282371 A1* | 11/2009 | Curl | G06F 19/327 715/863 |
| 2010/0056123 A1 | 3/2010 | Julian et al. | |
| 2010/0057969 A1 | 3/2010 | Meiri et al. | |
| 2010/0100200 A1* | 4/2010 | Kim | G06F 13/4081 700/12 |
| 2010/0188567 A1* | 7/2010 | Ichimura | G09G 5/006 348/441 |
| 2010/0197224 A1 | 8/2010 | Lahdenniemi et al. | |
| 2010/0211785 A1 | 8/2010 | Park et al. | |
| 2010/0260069 A1 | 10/2010 | Sakamoto et al. | |
| 2010/0290390 A1* | 11/2010 | Souissi | H04L 63/0236 370/328 |
| 2011/0059800 A1* | 3/2011 | Anderson | G07F 17/32 463/42 |
| 2011/0069179 A1* | 3/2011 | Bathiche | H04N 5/23206 348/207.1 |
| 2011/0125601 A1* | 5/2011 | Carpenter | G06Q 30/06 705/26.1 |
| 2011/0282526 A1* | 11/2011 | Mirle | B60L 1/10 701/22 |
| 2012/0057577 A1 | 3/2012 | Dwivedi et al. | |
| 2012/0099566 A1* | 4/2012 | Laine et al. | 370/338 |
| 2012/0155643 A1 | 6/2012 | Hassan et al. | |
| 2012/0169473 A1 | 7/2012 | Jalkanen et al. | |
| 2012/0265913 A1* | 10/2012 | Suumaki et al. | 710/303 |
| 2013/0016032 A1 | 1/2013 | Margulis | |
| 2013/0145050 A1 | 6/2013 | Huang et al. | |
| 2013/0204962 A1* | 8/2013 | Estevez | H04N 7/185 709/217 |
| 2013/0273847 A1* | 10/2013 | Le | H04L 12/1895 455/41.2 |
| 2014/0010221 A1* | 1/2014 | Panian | H04W 76/02 370/338 |
| 2014/0169212 A1* | 6/2014 | Villasenor | H04W 28/18 370/254 |
| 2014/0170602 A1* | 6/2014 | Reed | G09B 19/167 434/62 |
| 2014/0242911 A1* | 8/2014 | Holtman | G06F 1/1632 455/41.1 |
| 2015/0072614 A1* | 3/2015 | Holtman | G06F 1/1632 455/39 |

FOREIGN PATENT DOCUMENTS

| | | |
|---|---|---|
| WO | WO0145319 | 6/2001 |
| WO | WO0152179 | 7/2001 |
| WO | WO0211074 | 2/2002 |
| WO | 1633104 | 8/2006 |
| WO | WO2006106393 | 10/2006 |
| WO | WO2006130063 | 12/2006 |
| WO | WO2007001629 | 1/2007 |
| WO | WO2013038359 | 3/2013 |
| WO | WO2013114263 | 8/2013 |
| WO | WO2013132421 | 9/2013 |

OTHER PUBLICATIONS

NFC Activity Specification Candidate Technical Specification, NFC ForumTM, NFCForum-TS Activity-1.0_Candidate-11, Mar. 12, 2010, 118 pp.

NFC Forum Connection Handover Technical Specification NFC Forum TM Connection handover 1.1 NFCForum-TS-ConnectionHandover_1.1, Nov. 6, 2008, 43 pp.

NFC Forum; Logical Link Control Protocol; Technical Specification NFC Forum TM; LLCP 1.0; NFCForum-TS-LLCP 1.0: NFCForum-TS-LLCP_1.0; Dec. 11, 2009, 45 pp.

NFC Forum; NFC Data Exchange Format (NDEF) Technical Specification: NFC Forum TM; NDEF 1.0; NFCForum-TS-NDEF_1.0; Jul. 24, 2006, 25 pp.

WiFi Allicance, Wi-Fi Protected Setup Specification Version 1.0h; Dec. 2006, 110 pp.

WiFi Allicance, WiFi Configuration Specification Version 2.0 r42 unofficial draft-01; Feb. 9, 2010, 156 pp.

NFC Forum; Connection Handover; Technical Specification NFC Forum TM: Connection Handover 1.2; NFCForum-TS-ConnectionHandover_1_2.doc; Jul. 7, 2010, 27 pp.

Wi-Fi Peer-to-Peer (P2P) Technical Specification, Wi-Fi Alliance Technical Committee P2P Task Group, Version 1.1, 2010 Wi-Fi Alliance, 159 pp.

Radio Frequency Identification RFID—A basic primer; AIM Inc. White Paper; Aug. 23, 2001, the Association of the Automatic Identification and Data Capture Industry (AIM Inc.); WP-98/00R2, 17 pp.

Notice and Filing of Opposition in European Patent 1 685 689, 11 pp.

Reply to Notice of Opposition in European Patent 1 685 689, 11 pp.

Office Action for Korean Application No. 10-2006-7009441 dated Apr. 23, 2007.

(56) References Cited

OTHER PUBLICATIONS

Notice of Allowance for Korean Application No. 10-2006-7009441 dated Jan. 7, 2008.
J. Suomalainen, et al., "Standards for Security Associations in Personal Networks: A Comparative Analysis", International Journal of Security and Networks, vol. 4, Nos. 1-2, 2009, pp. 87-100.
Wu, et al.; "An Ubiquitous Data Delivery System in Hybrid Wireless Environments", Proceedings of the 2010 International Conference on P2P, Parallel, Grid, Cloud and Internet Computing, 2010, pp. 230-234.
Widmer, Peter "Smart Box Software Framework", Vision Document, Jul. 4, 2003, 23 pp.
Extended European Search Report for Application No. 14188579.8-1854 dated May 15, 2015.
"Wi-Fi Certified for Wi-fi Protected Setup: Easing the User Experience for Home and Small Office Wi-fi Networks", 2007, 2008, 2009 Wi-Fi Allicance. pp. 1-14.
Wi-Fi Simple Configuration Technical Specification, Version 2.0, 2010 Wi-Fi Allicance, 154 pp.

\* cited by examiner

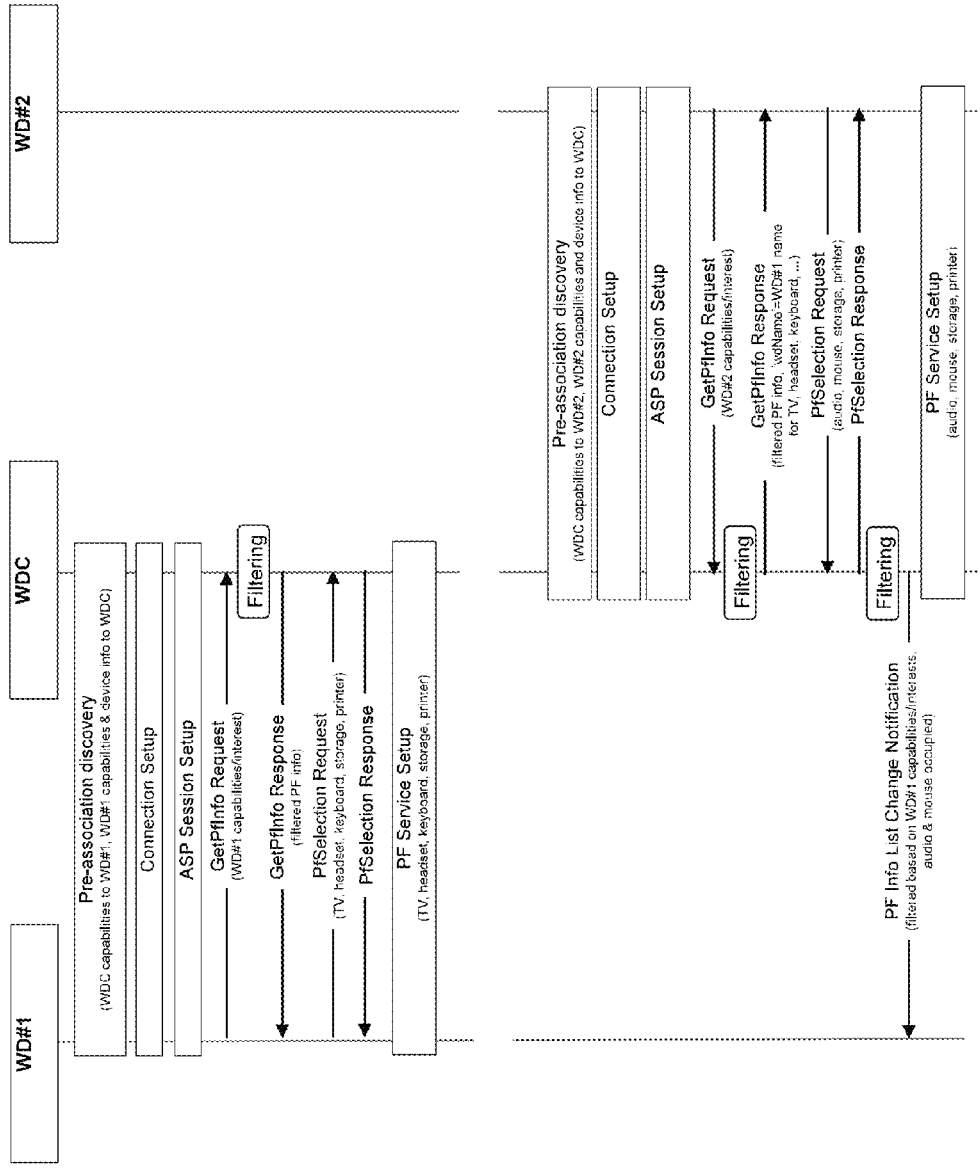
FIG. 4.1

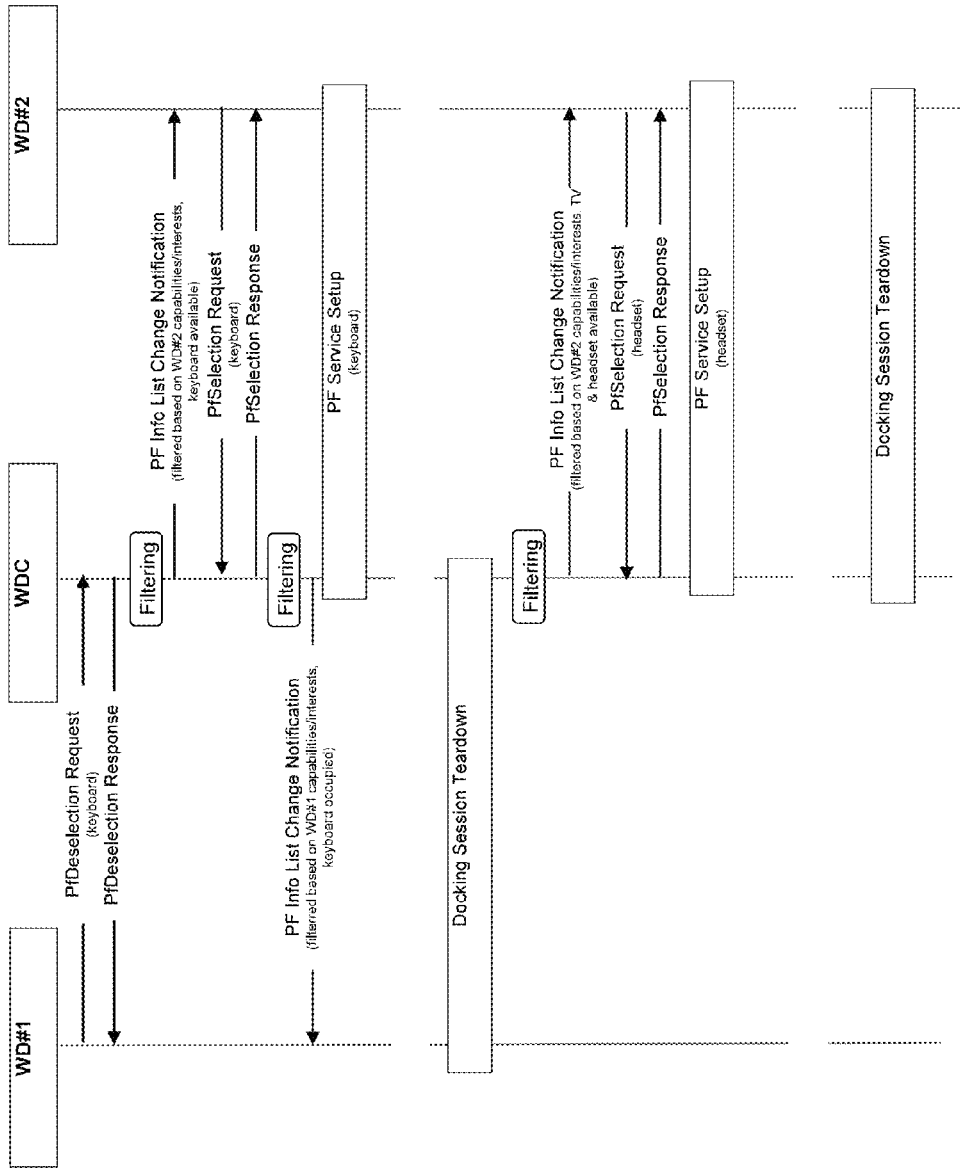
FIG. 4.2

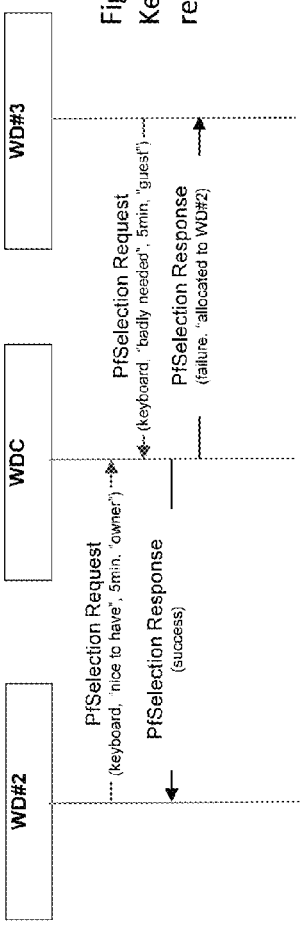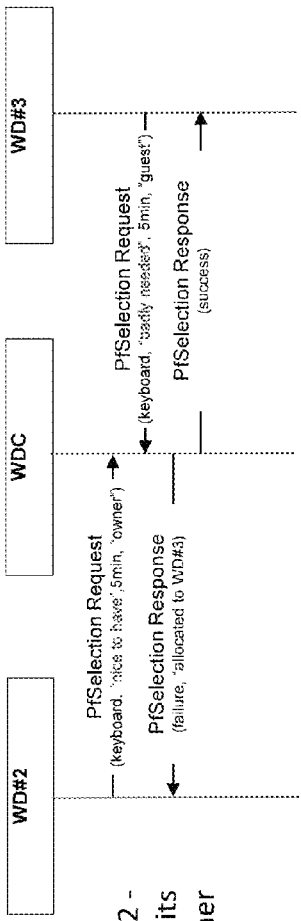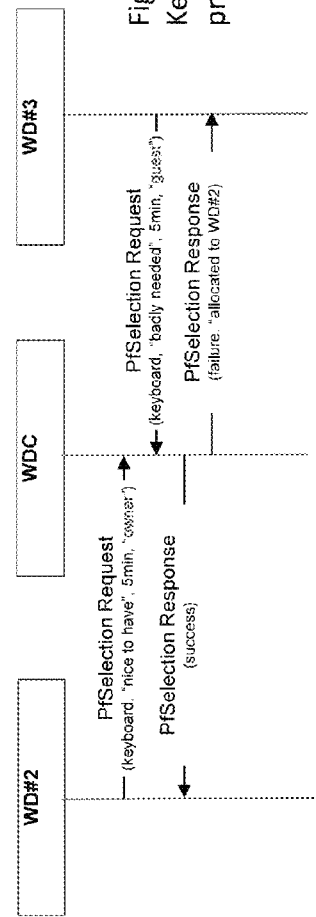
FIG. 6.1
Figure 6.1: Implementation option 1 - Keyboard is allocated to WD#2, as the request from WD#2 came first
FIG. 6.2
Figure 6.2: Implementation option 2 - Keyboard is allocated to WD#3, as its level of desire is higher
FIG. 6.3
Figure 6.3: Implementation option 3 - Keyboard is allocated to WD#2, as it is prioritized as the owner

FIG. 7.1

| Octets: | Octets: | Octets: | Octets: | Octet: | Octet: | Octets: N |
|---|---|---|---|---|---|---|
| MAC FRAME TYPE = MANAGEMENT | DOCKING MANAGEMENT | DESTINATION ADDRESS = DOCKING CENTER | SOURCE ADDRESS = DOCKEE | ELEMENT ID | LENGTH | MULTIPLE DOCKEE PF RELINQUISH REQUEST INFORMATION |

| Octets: N | Octets: N' | Octets: N'' |
|---|---|---|
| THE PF REQUESTED TO BE RELINQUISHED (E.g. 'Headset') | ARGUMENT #1 FOR THE REQUEST (e.g., priority_status_of_the_user with value such as 'owner') | ARGUMENT #N FOR THE REQUEST (e.g., willingness_for_'exchanging PFs' with value such as 'audio set') |

Other arguments are, e.g., level_of_desire with value such as 'badly needed', expected_duration_of_use with value such as '30 min'.

FIG. 7.2

| Octets: | Octets: | Octets: | Octets: | Octet: | Octet: | Octets: N |
|---|---|---|---|---|---|---|
| MAC FRAME TYPE= MANAGEMENT | DOCKING MANAGEMENT | DESTINATION ADDRESS = DOCKEE | SOURCE ADDRESS =DOCKING CENTER | ELEMENT ID | LENGTH | MULTIPLE DOCKEE PF RELINQUISH RESPONSE INFORMATION |

| Octets: N | Octets: N' | Octets: N'' |
|---|---|---|
| STATUS CODE FOR EACH DESIRED PF WITH VALUES: E.G., PF_RELINQUISHED, PF_SELECTED, PF_NOT_RELINQUISHED | REASON FOR THE DECISION (e.g., priority_status_of_the_user with value such as 'owner') | CONDITION FOR ALLOCATION (e.g., '20 min max' or 'until requested by the original PF user') |

Among other reasons are, e.g.,
Reason to reject the request, error code.

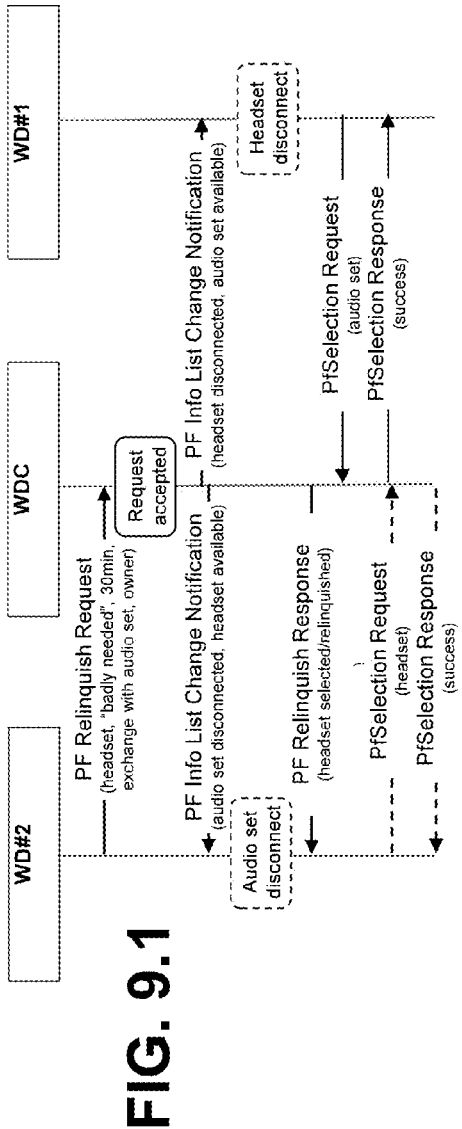
FIG. 9.1
Figure 9.1. The case where WD indicates its willingness to exchange PF
Relinquish request is resolved by the WDC (based on configuration)
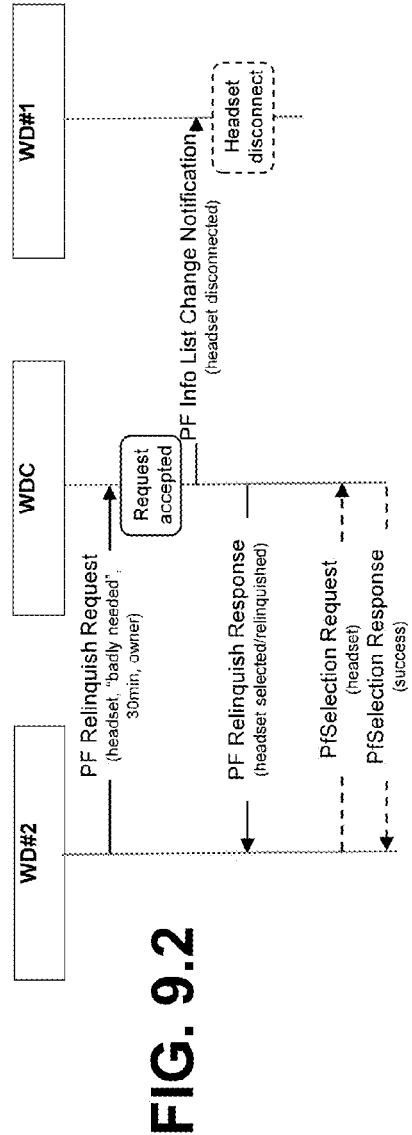
FIG. 9.2
Figure 9.2. Simplified case where WD does not indicate its willingness about exchanging PF

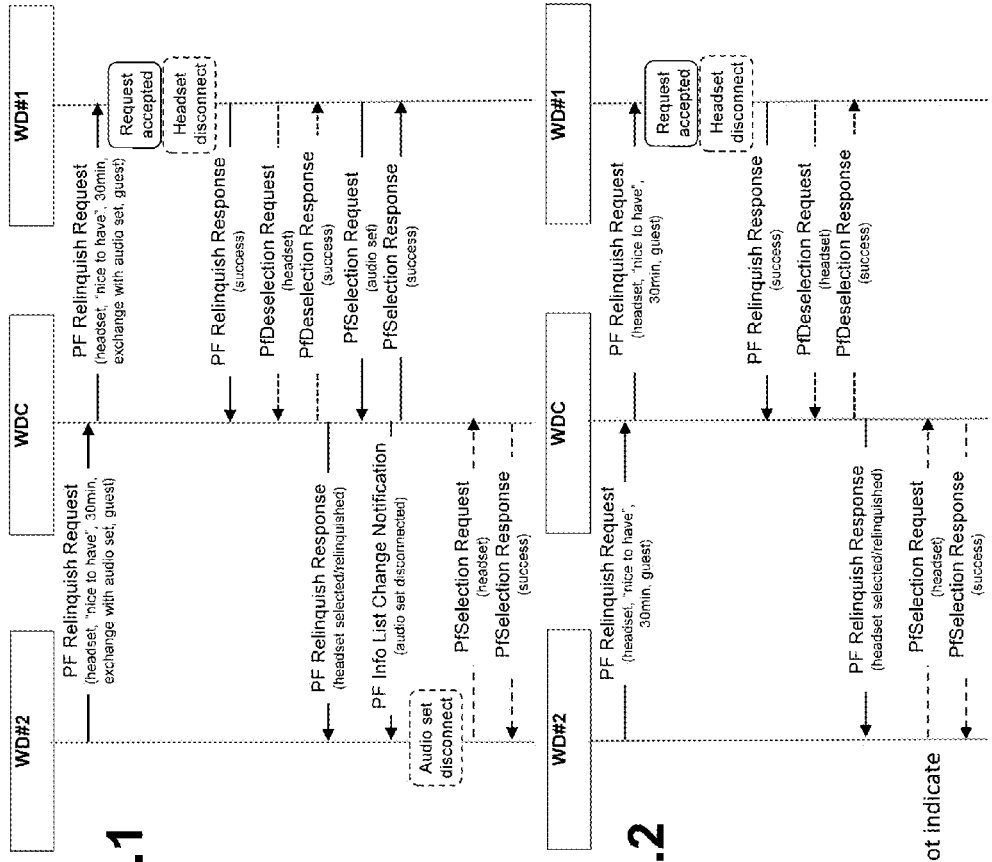
Figure 10.1. The case where WD indicates its willingness to exchange PF
Figure 10.2. Simplified case where WD does not indicate its willingness about exchanging PF

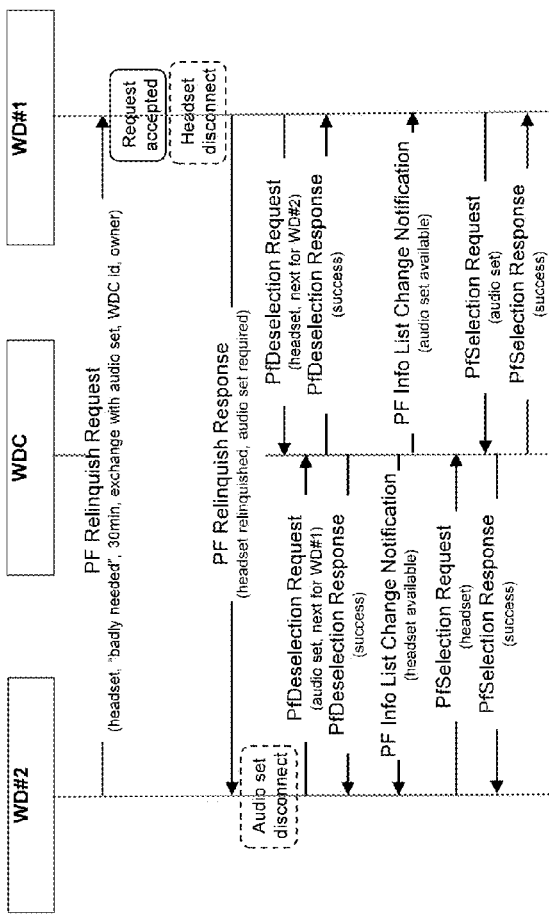
FIG. 11.1
Figure 11.1. The case where WD indicates its willingness to exchange PF.
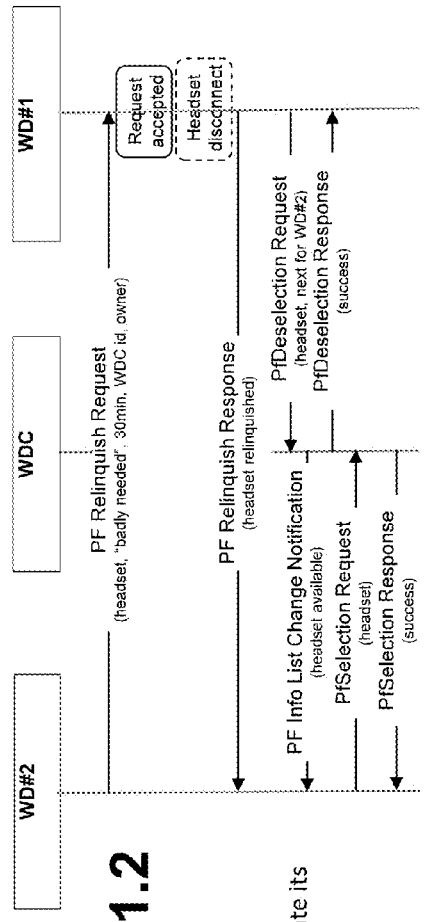
FIG. 11.2
Figure 11.2. Simplified case where WD does not indicate its willingness about exchanging PF.

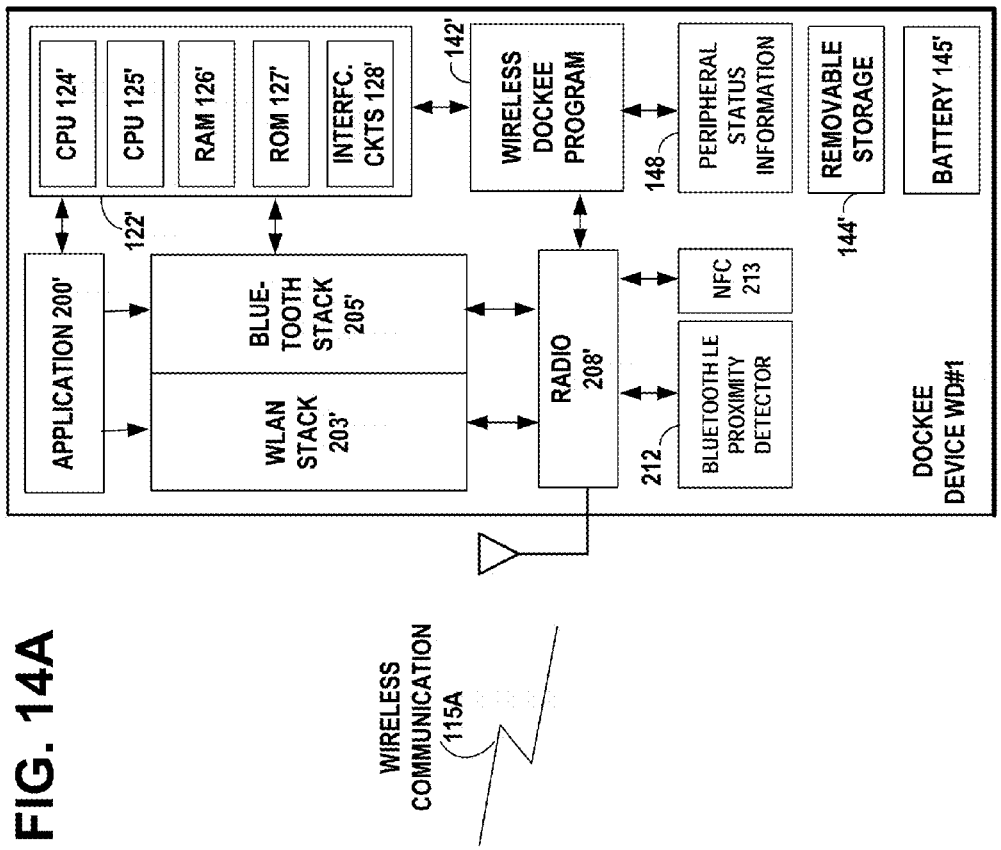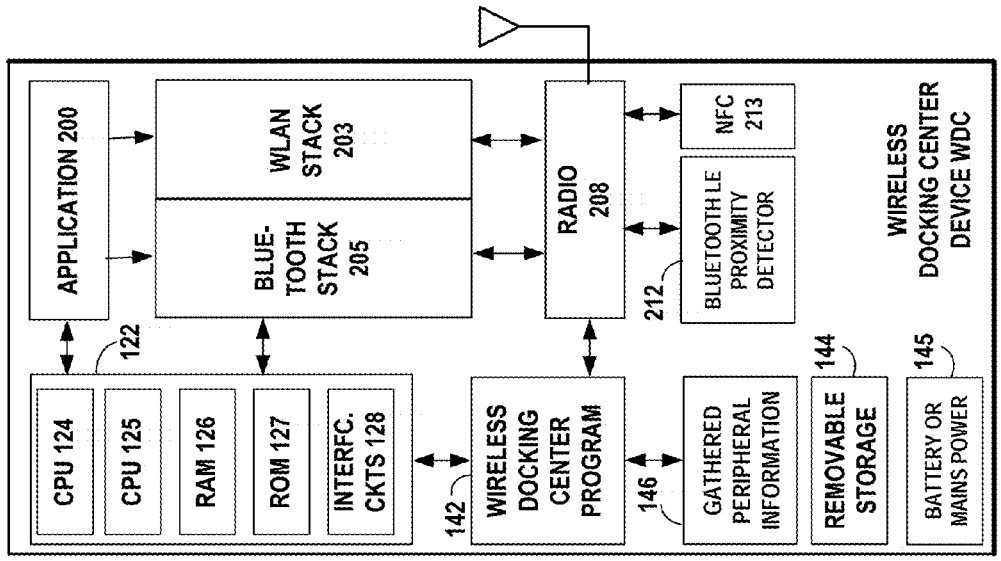
FIG. 14A

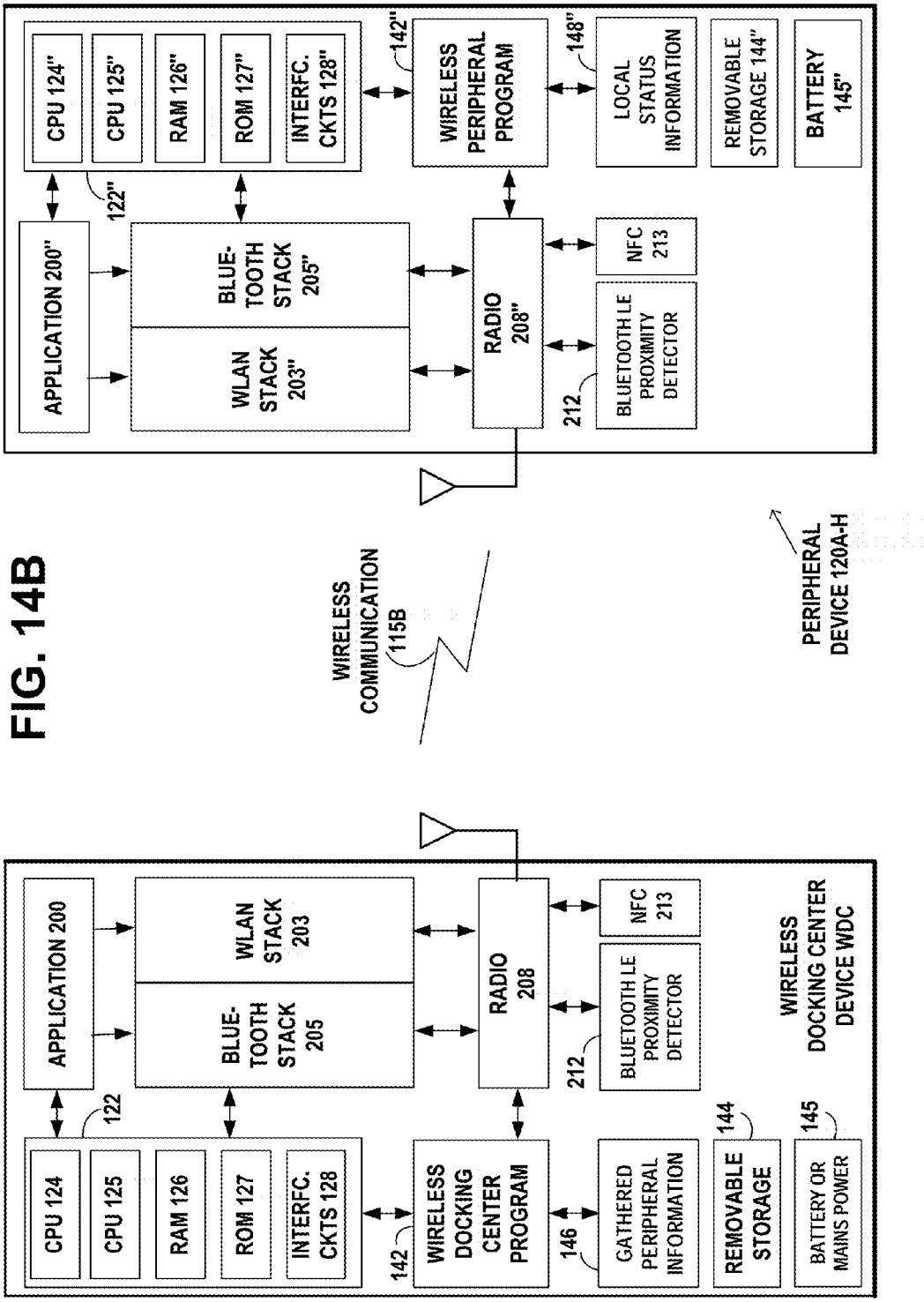

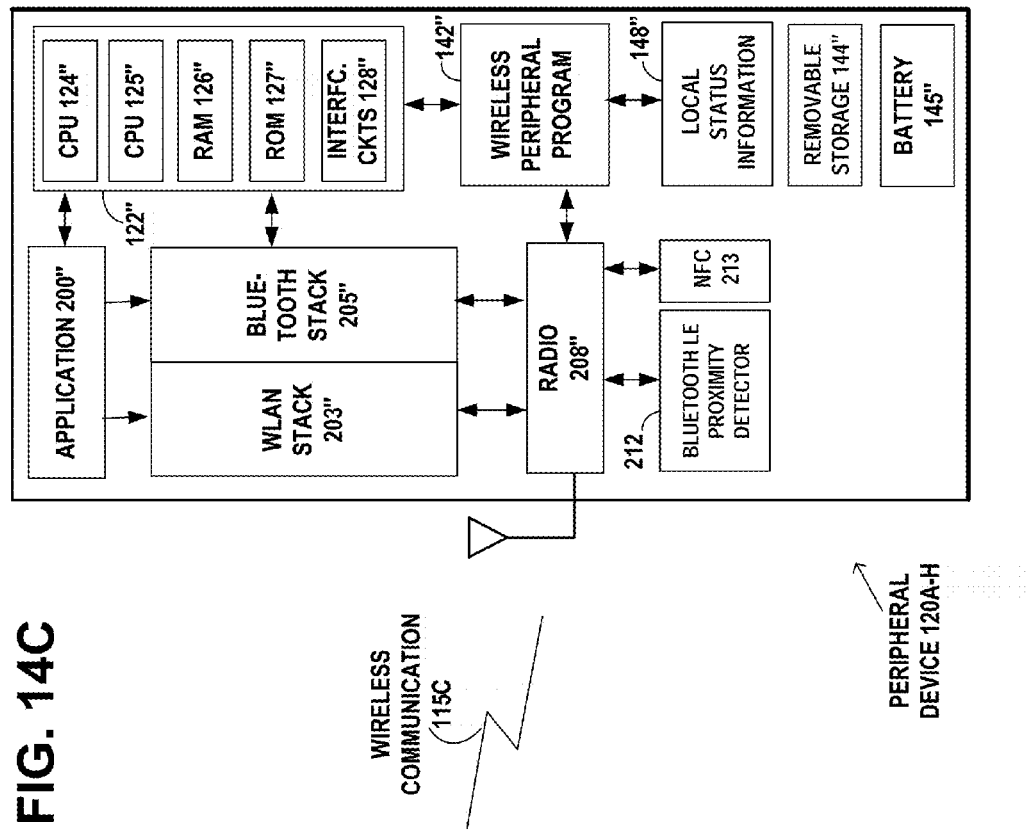
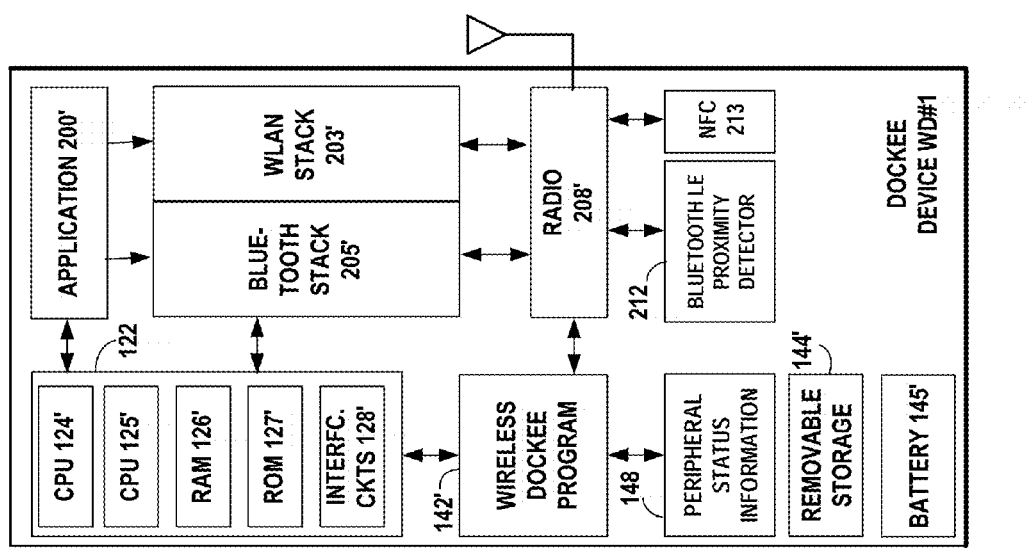
FIG. 14C

METHOD, APPARATUS, AND COMPUTER PROGRAM PRODUCT FOR MANAGING CONCURRENT CONNECTIONS BETWEEN WIRELESS DOCKEE DEVICES IN A WIRELESS DOCKING ENVIRONMENT

FIELD

The field of the invention relates to wireless communication, and more particularly to management of concurrent connections among multiple wireless devices, such as in a wireless docking environment.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2nd Generation digital cellular network communicating in the 900 MHZ/1.8 GHZ bands in Europe and at 850 MHz and 1.9 GHZ in the United States. The 3rd and 4th Generation digital cellular network communication technologies have evolved from GSM. While long-range communication networks, like the 3rd and 4th Generation digital cellular network technologies, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), NFC (Near Field Communication), and ultra-high frequency radio frequency identification (UHF RFID) technologies. All of these wireless communication technologies have features and advantages that make them appropriate for various applications.

Due to the limitation of size and available power in a battery powered handheld device, sometimes multiple devices may be connected locally to complement each other. For example, a smartphone or a tablet may be connected to a big screen monitor and a regular keyboard for user convenience. Docking is one example of such a connected device environment, where a central device, such as a laptop, tablet, or smartphone, may be connected to one or more peripheral devices to provide additional features, functions and flexibility to a user. All of the connected devices in the docking environment, appear as one virtual feature-rich device to a user.

Traditionally, docking station hardware has been used to plug in a laptop computer for use as a desktop computer, and to directly connect it with peripherals such as a monitor, keyboard, mouse, and other common peripherals. With the availability of powerful handheld devices, such as smartphones and tablets, there is an increasing trend to provide wireless docking, using Wi-Fi for example, to connect diverse types of portable devices. In wireless docking environment, a Wireless Docking Center (WDC) apparatus, which may be implemented as a stand-alone device, may manage a set of peripherals apparatuses and a Wireless Dockee (WD) apparatus, such as a laptop or smart phone, to connect the Wireless Dockee (WD) to the set of peripherals. Wireless docking opens up the possibility for simultaneous docking by multiple WDs with the same WDC.

SUMMARY

Method, apparatus, and computer program product embodiments enable a wireless docking center device to manage multiple wireless and/or wired peripheral devices on behalf of multiple wireless dockee devices simultaneously connected to the wireless docking center. Wireless docking is mentioned as example herein, but similar solutions may also be applied to other connected device environments.

An example embodiment of the invention includes a method comprising:

receiving, by a wireless docking center device, at least two request messages for peripheral functions from at least two wireless dockee devices, including a first request message for a peripheral function from a first wireless dockee device, and a second request message for the same peripheral function from a second wireless dockee device; and allocating, by the wireless docking center device, the requested peripheral function to the first wireless dockee device, based on determining at least a characteristic of the first request message indicates that the first wireless dockee device is entitled to the peripheral function.

An example embodiment of the invention includes a method comprising:

wherein the determination is based at least on the characteristic of the first peripheral function request message indicating at least one of the first peripheral function request message from the first wireless dockee device is received by the wireless docking center before the second peripheral function request message from the second wireless dockee device, the first peripheral function request message includes information indicating the first wireless dockee device has a greater need for the peripheral function than does the second wireless dockee device, the first peripheral function request message includes information indicating the first wireless dockee device has more suitable expected duration of use of the peripheral function than does the second wireless dockee device, and the first peripheral function request message includes information indicating the first wireless dockee device has a higher priority than does the second wireless dockee device.

An example embodiment of the invention includes a method comprising:

receiving, by the wireless docking center device, a relinquish request message from the second wireless dockee device, requesting that the first wireless dockee device relinquish its use for the requested peripheral function, the relinquish request message including information supporting the relinquish request;

analyzing, by the wireless docking center device, the information supporting the relinquish request, and considering configured settings including any conditions set by the first wireless dockee device to relinquish the requested peripheral function;

determining, by the wireless docking center device, to relinquish the requested peripheral function of the first wireless dockee device to the second wireless dockee device, based on the analysis;

disconnecting, by the wireless docking center device, the first wireless dockee device from the requested peripheral function to make the peripheral function available for the second wireless dockee device, in response to the determination; and transmitting, by the wireless docking center device, a relinquish response message to the second wireless dockee device, indicating availability or direct allocation of the requested peripheral function for the second wireless dockee device, based on the analysis.

An example embodiment of the invention includes a method comprising:

wherein the information supporting the relinquish request includes at least one of an indication of need for the requested peripheral function, a priority of the second wireless dockee device, an indication of a duration of the proposed use of the requested peripheral function, and an offer to exchange another peripheral function for the requested peripheral function; and wherein the conditions set by the first wireless dockee device to relinquish the peripheral function include at least one of no conditions, never relinquish the peripheral function while docked, allowing use of the relinquished peripheral function for a pre-defined time before release back to the first wireless dockee device, allowing use of the relinquished peripheral function until the first wireless dockee device re-starts use the peripheral function.

An example embodiment of the invention includes a method comprising:

receiving, by a wireless docking center device, from one or more wireless peripheral devices, information characterizing peripheral functions available from the at least the one or more wireless peripheral devices;

receiving, by the wireless docking center device, from one or more wireless dockee devices, information characterizing capabilities and/or interests of the one or more wireless dockee devices in a request message from one or more wireless dockee devices, and storing, by the wireless docking center device, the information for future use;

filtering, by the wireless docking center device, upon any change in peripheral information, to match the stored information characterizing peripheral functions available from the one or more wireless peripheral devices and/or a list of capabilities of features and functions the wireless docking center device supports, with the information characterizing capabilities and/or interests of the one or more wireless dockee devices; and transmitting, by the wireless docking center device, a peripheral information change notification message, to only the one or more wireless dockee devices, that have capabilities and/or interests that match the peripheral functions available from the one or more wireless peripheral devices and/or match the list of capabilities of features and functions the wireless docking center device supports.

An example embodiment of the invention includes a method comprising:

transmitting, by the wireless docking center device, a response message to the one or more wireless dockee devices that sent the request message, including capabilities and/or interests that match the peripheral functions available from the one or more wireless peripheral devices and/or the list of capabilities of features and functions the wireless docking center device supports.

An example embodiment of the invention includes a method comprising:

receiving, by the wireless docking center device, a selection request for connecting the peripheral function that was instantaneously indicated to be available in the transmitted change notification; and transmitting, by the wireless docking center device, a response message to a wireless dockee device that sent the request message.

An example embodiment of the invention includes a method comprising:

receiving, by a wireless docking center device, from a first wireless dockee device, information describing the first wireless dockee device, including at least one of the name, location information and communication information of the wireless dockee device;

receiving, by the wireless docking center device, from a second wireless dockee device, a request for querying or selecting one or more peripheral functions;

analyzing, by the wireless docking center device, to find that at least one of the requested peripheral functions is occupied by the first wireless dockee device; and providing, by the wireless docking center device, to the second wireless dockee device the information describing the first wireless dockee device, as a response to the received request for querying or selecting one or more peripheral functions.

An example embodiment of the invention includes an apparatus comprising:

at least one processor;

at least one memory including computer program code;

the at least one memory and the computer program code configured to, with the at least one processor, cause the apparatus at least to:

receive at least two request messages for peripheral functions from at least two wireless dockee devices, including a first request message for a peripheral function from a first wireless dockee device, and a second request message for the same peripheral function from a second wireless dockee device; and allocate the requested peripheral function to the first wireless dockee device, based on determining at least a characteristic of the first request message indicates that the first wireless dockee device is entitled to the peripheral function.

An example embodiment of the invention includes an apparatus comprising:

wherein the determination is based at least on the characteristic of the first peripheral function request message indicating at least one of the first peripheral function request message from the first wireless dockee device is received by the apparatus before the second peripheral function request message from the second wireless dockee device, the first peripheral function request message includes information indicating the first wireless dockee device has a greater need for the peripheral function than does the second wireless dockee device, the first peripheral function request message includes information indicating the first wireless dockee device has more suitable expected duration of use of the peripheral function than does the second wireless dockee device, and the first peripheral function request message includes information indicating the first wireless dockee device has a higher priority than does the second wireless dockee device.

An example embodiment of the invention includes an apparatus comprising:

the at least one memory and the computer program code configured to, with the at least one processor, cause the apparatus at least to:

receive a relinquish request message from the second wireless dockee device, requesting that the first wireless dockee device relinquish its use for the requested peripheral function, the relinquish request message including information supporting the relinquish request;

wherein the information supporting the relinquish request includes at least one of an indication of need for the requested peripheral function, a priority of the second wireless dockee device, an indication of a duration of the proposed use of the requested peripheral function, and an offer to exchange another peripheral function for the requested peripheral function;

analyze the information supporting the relinquish request, and considering configured settings including any conditions set by the first wireless dockee device to relinquish the requested peripheral function;

wherein the conditions set by the first wireless dockee device to relinquish the peripheral function include at least one of no conditions, never relinquish the peripheral function while docked, allowing use of the relinquished peripheral function for a pre-defined time before release back to the first wireless dockee device, allowing use of the relinquished peripheral function until the first wireless dockee device re-starts use the peripheral function;

disconnect the first wireless dockee device from the requested peripheral function to make the peripheral function available for the second wireless dockee device; and transmit a relinquish response message to the second wireless dockee device, indicating availability or allocation of the requested peripheral function for the second wireless dockee device, based on the analysis.

An example embodiment of the invention includes an apparatus comprising:

at least one processor;

at least one memory including computer program code;

the at least one memory and the computer program code configured to, with the at least one processor, cause the apparatus at least to:

receive from one or more wireless peripheral devices, information characterizing peripheral functions available from the at least the one or more wireless peripheral devices;

receive from one or more wireless dockee devices, information characterizing capabilities and/or interests of the one or more wireless dockee devices in a request message from one or more wireless dockee devices, and storing, by the apparatus, the information for future use;

filter upon any change in peripheral information, to match the stored information characterizing peripheral functions available from the one or more wireless peripheral devices and/or a list of capabilities of features and functions the apparatus supports, with the information characterizing capabilities and/or interests of the one or more wireless dockee devices; and transmit a peripheral information change notification message, to only the one or more wireless dockee devices, that have capabilities and/or interests that match the peripheral functions available from the one or more wireless peripheral devices and/or match the list of capabilities of features and functions the apparatus supports.

An example embodiment of the invention includes an apparatus comprising:

the at least one memory and the computer program code configured to, with the at least one processor, cause the apparatus at least to:

transmit a response message to the one or more wireless dockee devices that sent the request message, including capabilities and/or interests that match the peripheral functions available from the one or more wireless peripheral devices and/or the list of capabilities of features and functions the wireless docking center device supports.

An example embodiment of the invention includes an apparatus comprising:

the at least one memory and the computer program code configured to, with the at least one processor, cause the apparatus at least to:

receive a selection request for connecting the peripheral function that was instantaneously indicated to be available in the transmitted change notification; and transmit a response message to a wireless dockee device that sent the request message.

An example embodiment of the invention includes an apparatus comprising:

the at least one memory and the computer program code configured to, with the at least one processor, cause the apparatus at least to:

receive from a first wireless dockee device, information describing the first wireless dockee device, including at least one of the name, location information and communication information of the wireless dockee device;

receive from a second wireless dockee device, a request for querying or selecting one or more peripheral functions;

analyze to find that at least one of the requested peripheral functions is occupied by the first wireless dockee device; and provide to the second wireless dockee device the information describing the first wireless dockee device, as a response to the received request for querying or selecting one or more peripheral functions.

An example embodiment of the invention includes a computer program product comprising computer executable program code recorded on a computer readable, non-transitory storage medium, the computer executable program code, when executed by a computer processor, comprising:

code for receiving, by a wireless docking center device, at least two request messages for peripheral functions from at least two wireless dockee devices, including a first request message for a peripheral function from a first wireless dockee device, and a second request message for the same peripheral function from a second wireless dockee device; and code for allocating, by the wireless docking center device, the requested peripheral function to the first wireless dockee device, based on determining at least a characteristic of the first request message indicates that the first wireless dockee device is entitled to the peripheral function.

An example embodiment of the invention includes a computer program product comprising:

code for receiving, by the wireless docking center device, a relinquish request message from the second wireless dockee device, requesting that the first wireless dockee device relinquish its use for the requested peripheral function, the relinquish request message including information supporting the relinquish request;

wherein the information supporting the relinquish request includes at least one of an indication of need for the requested peripheral function, a priority of the second wireless dockee device, an indication of a duration of the proposed use of the requested peripheral function, and an offer to exchange another peripheral function for the requested peripheral function;

code for analyzing, by the wireless docking center device, the information supporting the relinquish request, and considering configured settings including any conditions set by the first wireless dockee device to relinquish the requested peripheral function;

wherein the conditions set by the first wireless dockee device to relinquish the peripheral function include at least one of no conditions, never relinquish the peripheral function while docked, allowing use of the relinquished peripheral function for a pre-defined time before release back to the first wireless dockee device, allowing use of the relinquished peripheral function until the first wireless dockee device re-starts use the peripheral function;

code for disconnecting, by the wireless docking center device, the first wireless dockee device from the requested peripheral function to make the peripheral function available for the second wireless dockee device; and code for transmitting, by the wireless docking center device, a relinquish response message to the second wireless dockee device, indicating availability or allocation of the requested peripheral function for the second wireless dockee device, based on the analysis.

An example embodiment of the invention includes a computer program product comprising:

computer program product comprising computer executable program code recorded on a computer readable, non-transitory storage medium, the computer executable program code, when executed by a computer processor, comprising:

code for receiving, by a wireless docking center device, from one or more wireless peripheral devices, information characterizing peripheral functions available from the at least the one or more wireless peripheral devices;

code for receiving, by the wireless docking center device, from one or more wireless dockee devices, information characterizing capabilities and/or interests of the one or more wireless dockee devices in a request message from one or more wireless dockee devices, and storing, by the wireless docking center device, the information for future use;

code for filtering, by the wireless docking center device, upon any change in peripheral information, to match the stored information characterizing peripheral functions available from the one or more wireless peripheral devices and/or a list of capabilities of features and functions the wireless docking center device supports, with the information characterizing capabilities and/or interests of the one or more wireless dockee devices; and code for transmitting, by the wireless docking center device, a peripheral information change notification message, to only the one or more wireless dockee devices, that have capabilities and/or interests that match the peripheral functions available from the one or more wireless peripheral devices and/or match the list of capabilities of features and functions the wireless docking center device supports.

An example embodiment of the invention includes a computer program product comprising:

code for receiving, by the wireless docking center device, a selection request for connecting the peripheral function that was instantaneously indicated to be available in the transmitted change notification; and code for transmitting, by the wireless docking center device, a response message to a wireless dockee device that sent the request message.

An example embodiment of the invention includes a computer program product comprising:

code for receiving, by a wireless docking center device, from a first wireless dockee device, information describing the first wireless dockee device, including at least one of the name, location information and communication information of the wireless dockee device;

code for receiving, by the wireless docking center device, from a second wireless dockee device, a request for querying or selecting one or more peripheral functions;

code for analyzing, by the wireless docking center device, to find that at least one of the requested peripheral functions is occupied by the first wireless dockee device; and code for providing, by the wireless docking center device, to the second wireless dockee device the information describing the first wireless dockee device, as a response to the received request for querying or selecting one or more peripheral functions.

DESCRIPTION OF THE FIGURES

FIG. 4.1 illustrates first part of an example information flow between the wireless docking center (WDC) and wireless dockee devices (WDs), in accordance with an example embodiment of the invention.

FIG. 4.2 illustrates the last part of an example information flow between WDC and WDs, in accordance with an example embodiment of the invention.

FIG. 6.1 illustrates an example information flow for resolving multiple selection requests for the same PF, illustrates an example Implementation option 1—Keyboard is allocated to WD#2, as the request from WD#2 came first, in accordance with an example embodiment of the invention.

FIG. 6.2 illustrates an example information flow for resolving multiple selection requests for the same PF, illustrates an example Implementation option 2—Keyboard is allocated to WD#3, as its level of desire is higher, in accordance with an example embodiment of the invention.

FIG. 6.3 illustrates an example information flow for resolving multiple selection requests for the same PF, illustrates an example Implementation option 3—Keyboard is allocated to WD#2, as it is prioritized as the owner, in accordance with an example embodiment of the invention.

FIG. 7.1 illustrates an example PF Relinquish Request Message Structure, in accordance with an example embodiment of the invention.

FIG. 7.2 illustrates an example PF Relinquish Response Message Structure, in accordance with an example embodiment of the invention.

FIG. 9.1 illustrates an example information flow for resolving PF Relinquish request in WDC, the case where WD indicates its willingness to exchange PF, in accordance with an example embodiment of the invention.

FIG. 9.2 illustrates an example information flow for resolving PF Relinquish request in WDC, simplified case where WD does not indicate its willingness about exchanging PF, in accordance with an example embodiment of the invention.

FIG. 10.1 illustrates an example information flow for resolving PF Relinquish request in WD (through WDC), the case where WD indicates its willingness to exchange PF, in accordance with an example embodiment of the invention.

FIG. 10.2 illustrates an example information flow for resolving PF Relinquish request in WD (through WDC), simplified case where WD does not indicate its willingness about exchanging PF, in accordance with an example embodiment of the invention.

FIG. 11.1 illustrates an example information flow for resolving PF Relinquish request directly between WDs, the case where WD indicates its willingness to exchange PF, in accordance with an example embodiment of the invention.

FIG. 11.2 illustrates an example information flow for resolving PF Relinquish request directly between WDs, simplified case where WD does not indicate its willingness about exchanging PF, in accordance with an example embodiment of the invention.

FIG. 14A illustrates an example network diagram and functional block diagram of an example wireless docking center device and an example wireless dockee device, in accordance with an example embodiment of the invention.

FIG. 14B illustrates an example network diagram and functional block diagram of the example wireless docking center device and an example wireless peripheral device, in accordance with an example embodiment of the invention. Not all peripheral devices are necessarily equipped with all the components shown in the figure, and some peripheral devices may be connected by wire to the wireless docking center device.

FIG. 14C illustrates an example network diagram and functional block diagram of wireless dockee device and the wireless peripheral device, in accordance with an example embodiment of the invention.

DISCUSSION OF EXAMPLE EMBODIMENTS OF THE INVENTION

Figure 1:
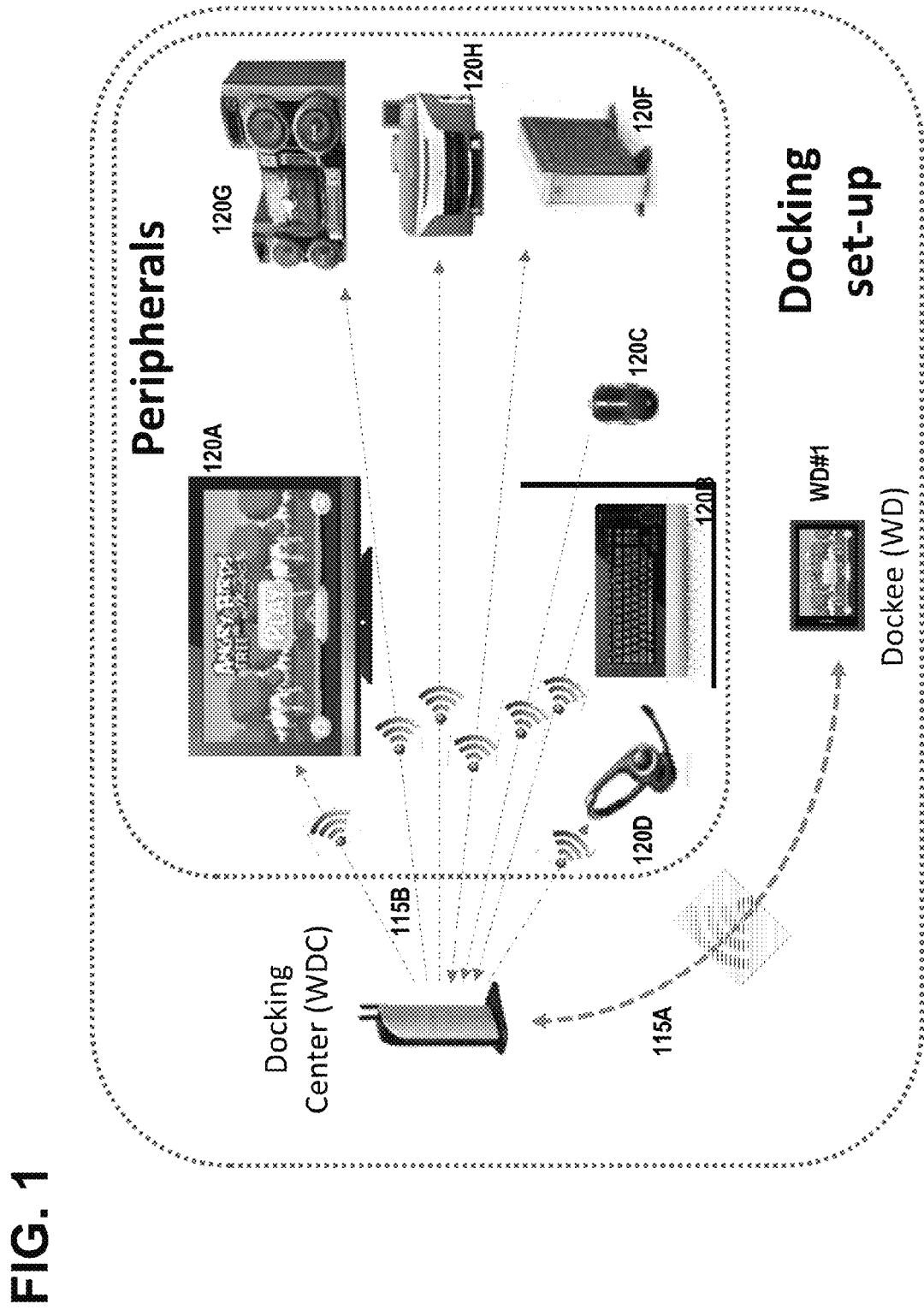
FIG. 1 illustrates an example network diagram of a wireless docking set-up, showing examples of a wide variety of possible peripheral devices that may have either a wireless or wired connection to the docking center device.

In general, wireless docking provides the means of connecting a Wireless Dockee (WD) apparatus to a set of external peripheral devices (e.g., large screen monitor, keyboard, mouse, headset, external webcam, microphone, speaker, storage, game pad, printer) mostly for input/output purposes in different environments (e.g., home entertainment; home office; enterprise/corporate office; meeting room; public access workplaces like internet cafe, lounge, hotel, train, plane, bus; automotive environments). Here, WD may comprise a range of portable devices like mobile phone, tablet, netbook, laptop, camera, camcorder, media player, game console, or like. In traditional/legacy docking environment, a set of common peripherals are connected by wires to an electronic device (commonly called dock or docking station), and a portable device (mostly laptops) plugs-into the docking station to have connection with all the connected peripherals in one shot. As there is interesting and increasing trend of supporting wireless (e.g., Wi-Fi) by different kind of portable devices, a motivation for wireless docking is to have wireless connection between connected devices in a docking case. The intention is to improve user experience by having additional features, functions and flexibilities. In wireless docking, a logical entity, called Wireless Docking Center (WDC) apparatus may manage a set of peripheral apparatuses. A dockee device (WD) may connect to the WDC to have access to the set or subset of all the peripherals managed by the WDC apparatus. In practice, WDC apparatus may be implemented in an independent physical device, or may be co-located in any other device (e.g., peripherals, WD). An example set-up of a wireless docking solution is shown in FIG. 1, where WDC is in an independent device. The term "docking", as used below, primarily means wireless docking FIG. 1 illustrates an example network diagram of a wireless docking set-up, showing examples of a wide variety of possible peripheral devices that may have either a wireless or wired connection to the docking center device, in accordance with an example embodiment of the invention. A wireless docking center device WDC may be in wireless communication 115A with one or more wireless dockee devices WD#1 and WD#2, and in wireless or wired communication 115B with one or more wireless peripheral devices 120A through 120H that may be respectively battery-powered. The portable device, Wireless Dockee (WD), docks wirelessly (e.g., activated by NFC touch and using Wi-Fi Direct connection) to a Wireless Docking Center (WDC) that takes care of configuring, setting-up and managing all the connections between the WD and the (wireless or even legacy wired) peripheral devices. The potential application environments for Wireless Docking include, e.g., home office, enterprise/corporate office; meeting room; public access workplaces like internet cafe, airport lounge, hotel; home entertainment; automotive environment.

The Wireless Docking is expected to improve the user experience by having additional features, functions and flexibilities that are not possible with the wired docking Possibility to support multiple WDs docked with a specific WDC concurrently is one highly potential feature for enriched user experience enabled through wireless docking Example embodiments of the invention build on the multiple dockee feature that is explained below.

Figure 2:
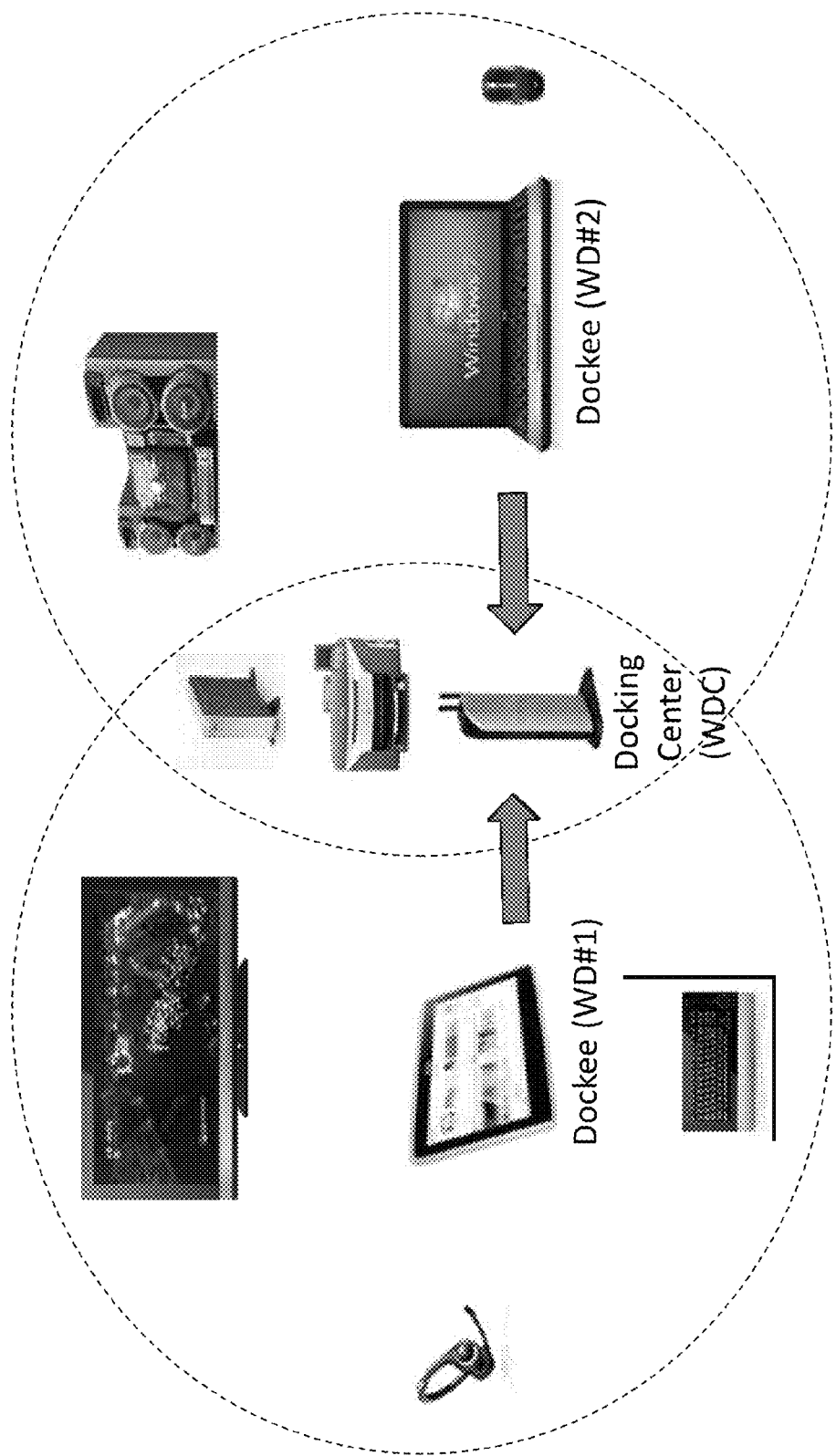
FIG. 2 illustrates an example network diagram of docking with multiple dockees, in accordance with an example embodiment of the invention.

Wireless docking opens up new usage scenarios for docking to peripheral devices. Possibility for more than one user with their WDs accessing concurrently the peripherals managed by a WDC is one new use case. An example case of docking with multiple dockees is shown in FIG. 2. The WD#1 (a tablet) docks to WDC to use TV set, wireless headset, wireless keyboard, media storage and printer. The WD#2 (a laptop) instead docks to WDC to connect to audio system, wireless mouse, media storage and printer, while WD#1 is still docked. Both WDs share media storage and printer as shared peripherals.

FIG. 2 illustrates an example network diagram of docking with multiple dockees, in accordance with an example embodiment of the invention. For a WDC, the support for multiple dockees means in its simplest form the ability to make the associated PFs available for use by multiple WDs concurrently. The associated PFs are either shareable or non-shareable. A shareable PF may be used by multiple dockees at the same time, while a non-shareable PF may only be used by one WD at a time. For a WD, a docking session concurrently with other WDs may be considered in its simplest form just like a single dockee session independent of other WDs. Example embodiments of the invention support unique aspects of the multiple dockee use case. In example embodiments of the invention, both WDC and WDs have enriched capabilities enabled by new messaging and information elements. In example embodiments of the invention, a WD is able to dynamically select and deselect peripherals. The user of the WD may occupy or use only those peripherals that she needs, thus enabling other users to dock with the same WDC and use the peripherals that are not already occupied. In example embodiments of the invention, changes may be signaled in the status of PFs occupation to other WDs to allow those to take benefit of this information, for example, to select a released PF. In example embodiments of the invention, it is possible to target the signaling information to only those WDs that have the capability to use the specific PFs. In example embodiments of the invention, there may also be a competition for the same peripheral, and a WDC is able to resolve the conflicts in a reasonable manner. In example embodiments of the invention, a WD may request an occupied peripheral and negotiate its release for its own use, thereby bringing more value to the multiple dockee use case. In example embodiments of the invention, the primary role of the WDC is to be in a central role of managing the access to PFs by WDs, however in alternate example embodiments there may be direct communication between multiple WDs to provide additional intuitive and straightforward ways to manage a WD's access to peripherals. The PFs allocation resolution by the WDC may be based on comparison and weighting of the relative importance of one or more characteristics of the first wireless dockee device vs one or more characteristics of at least a second wireless dockee device. There may be human interaction between users facilitated by the information available through the docking system.

Example embodiments of the invention define methods, new messages and information elements for a docking solution in order to properly support unique aspects of multiple dockee use case in a wireless docking solution:

Example embodiments of the invention provide signaling of the capabilities and characteristics of both WDC and WDs that are relevant or useful to support multiple dockee usage. The capabilities include, e.g., WDC support for multiple dockee sessions, WD support to select/de-select individual Peripherals and Peripheral Function Protocols. The characteristics are, e.g., user friendly name of WDs (such as 'wdName') or WD location that help dynamic management of peripheral usage and communication among (users of) WDs. The capability and characteristics information would also help, e.g., the WDC to target information of available PFs to those WDs only that have capability to take the specific PFs in use.

Example embodiments of the invention provide a methodology for WDC to manage competing access requests to an available PF by multiple WDs simultaneously. Request attributes by WDs (e.g. level of desire, expected usage time) to be used as parameters in the WDC decision making algorithm are proposed.

Example embodiments of the invention provide a methodology, signaling messages and information elements for a WD to request and negotiate to relinquish a PF currently being used by another WD. The WDC is typically in a central role of managing the access to PFs by WDs. However, in case of multiple dockees there is also a possibility to direct communication between WDs that can provide additional intuitive and straightforward ways to manage WD's access to peripherals. Embodiments are described for both WDC managed and direct WD-to-WD managed communication cases. Specific parameters and their use helping also a user-to-user communication in dynamic docking set-up negotiations are defined.

Example embodiments of the invention provide a user interface (UI) design of a WD and a working procedure to support docking in a multiple dockee environment. The user should be able to understand the status of the docking set-up intuitively and be able to act with simple and easy steps dynamically based on the user need.

Figure 3:
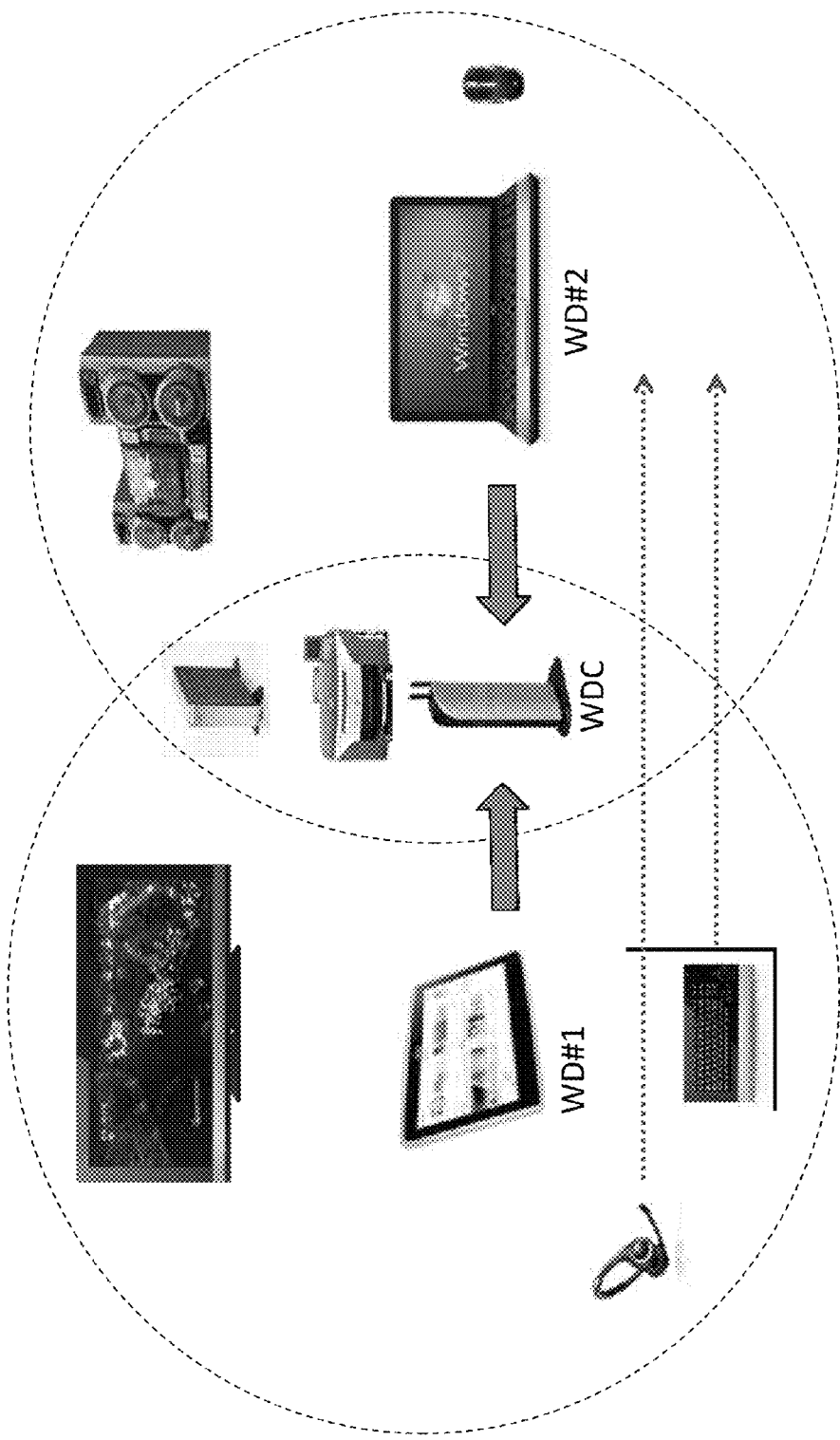
FIG. 3 illustrates an example network diagram of the multiple dockees case with dynamic peripheral function (PF) (de)selection, in accordance with an example embodiment of the invention.

FIG. 3 illustrates an example network diagram of the multiple dockees case with dynamic peripheral function (PF) (de)selection, in accordance with an example embodiment of the invention. The example docking case in FIG. 2 is used as the basis for FIG. 3 to show the dynamic selection/connection and de-selection/dis-connection of PFs. Information flow (procedure) between WDC and WDs (in an example implementation) are described below. The example docking case with multiple dockees in FIG. 3 is used for the information flow description. As depicted in FIG. 3, the WD#1 (a tablet) docks first for using the following peripherals: TV set, wireless headset, wireless keyboard, media storage and printer. Later on, WD#2 (a laptop) docks for connecting it to audio system, wireless mouse, media storage and printer, while WD#1 is still docked. As media storage and printer are shareable peripherals, those can be connected to both the WDs at the same time. After a while, when WD#1 disconnects itself from wireless keyboard, WD#2 connects with wireless keyboard. Afterwards, when WD#1 undocks, WD#2 connects with wireless headset, but not with the TV set that also becomes available.

FIGS. 4.1 and 4.2 illustrate an example information flow between the wireless docking center (WDC) and wireless devices (WDs), in accordance with an example embodiment of the invention. The associated information flow is shown in FIGS. 4.1 and 4.2, and different steps are described below sequentially.

Pre-Association Discovery and Capability Indication/Negotiation

During the pre-association discovery, the WDC communicates the list of its capabilities to WD. The list of capability includes the ability to support multiple dockees by having 'multipleDockees' as an additional value to 'optionalFeatureName' in 'preassociationServiceDiscovery' element. WDC includes its capability in AdvertiseService( ) method. To be specific, capabilities are expressed under 'preassociationServiceDiscovery' element and carried as 'service_information' parameter in the method. In this invention, it is also proposed that the WD indicates its capability or interest to WDC. Here, interest means any specific (subset of) capability that a WD is interested about for a docking session. The WD capability or interest can be expressed as string and carried as 'service_information_request' parameter in SeekService( ) method. As for example, the WD can indicate the supported PF protocols (e.g., 'wifiDisplay', 'wifiSerialBus'). Optional features (e.g., 'specificPfSelection', 'wdnSelection') can also be included within 'service_information_request', if the WD wants to connect to a WDC that support a specific optional feature(s). The WD capability/interest can be used by the WDC to customize (filtering and/or matching) the PF information in a message and/or notification.

Figure 5:
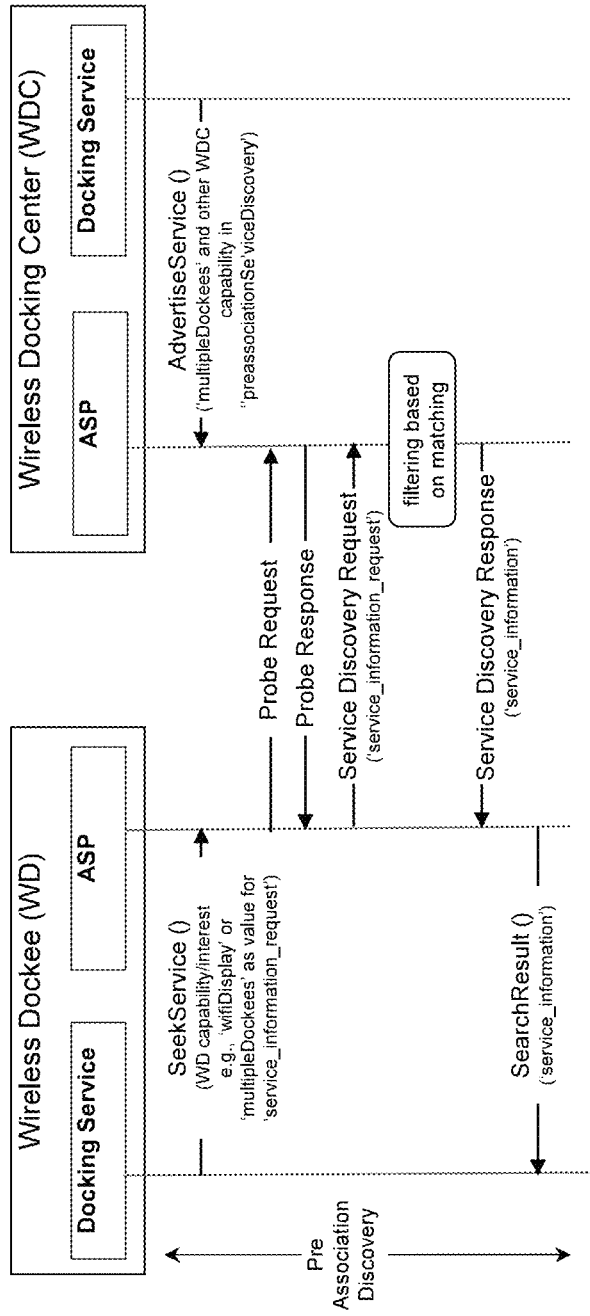
FIG. 5 illustrates an example information flow between WDC and WD in pre-association discovery to show how dockee capability/interest and WDC capabilities of features and functions is communicated and used in pre-association, in accordance with an example embodiment of the invention.

FIG. 5 illustrates an example information flow between WDC and WD in pre-association discovery, in accordance with an example embodiment of the invention. One example case, how the WD capability or interest in SeekService( ) method can be used by a WDC to customize PF information is shown in FIG. 5. In the figure, pre-association related information flow is shown in detail, and two separate functions Docking Service and ASP are shown in both WD and WDC. ASP (Application Service Platform) is a generic function to manage different aspects (e.g., discovery, session management, security) of multiple services using Wi-Fi Direct, and it is defined in Wi-Fi Alliance (WFA) as a component of Wi-Fi Direct Services (WFDS). Docking Service is docking-specific function to manage different aspects of docking. If SeekService( ) includes WD capability/interest in terms of 'service_information_request' as proposed above, the ASP in WD forwards it to the peer ASP in Service Discovery Request after Probe Request/Response. The peer ASP (in WDC) checks if 'service_information_request' matches with 'service_information' provided by the Docking Service in WDC in AdvertiseService( ). If it matches, the ASP in WDC filters the 'service_information' based on 'service_information_request'. An example 'preassociationServiceDiscovery' element of a WDC (supporting TV screen, wireless keyboard and wireless mouse) is shown below in Table 1. The abbreviation "PFP" stands for Peripheral Function Protocol (PFP): A protocol through which a PF can be used/accessed through a Wi-Fi network. Examples of PFPs are Wi-Fi Serial Bus (WSB), Wi-Fi Display, and WiGig Display Extension. Note that the XML document is not complete. This is sent by the Docking Service in WDC to ASP in WDC as 'service_information' parameter in AdvertiseService( ).

TABLE 1

```
<xsd:element name="preassociationServiceDiscovery">
    <xsd:element name="deviceType" wdc></xsd:element>
    <xsd:element name="deviceName" Wireless docking
    for basic office></xsd:element>
    <xsd:element name="available" TRUE></xsd:element>
    <xsd:element name="optionalFeature"
    userTypeAuthentication></xsd:element>
    <xsd:element name="optionalFeature"
    specificPfSelection></xsd:element>
    <xsd:element name="optionalFeature"
    vicinityUndocking></xsd:element>
    <xsd:element name="optionalFeature"
    multipleDockees></xsd:element>
    <xsd:element name="pfInfo">
        <xsd:element name="pfp" wifiDisplay></xsd:element>
        <xsd:element name="id" 12345"></xsd:element>
        <xsd:element name="name" TV screen></xsd:element>
        <xsd:element name="isUserTypeAuthRequired"
        FALSE></xsd:element>
        <xsd:element name="state" occupied></xsd:element>
        <xsd:element name="wdName" Mim's tablet></xsd:element>
        <xsd:element name="shareable" FALSE></xsd:element>
    </xsd:element>
    <xsd:element name="pfInfo">
        <xsd:element name="pfp" wifiSerialBus></xsd:element>
        <xsd:element name="id" 23456"></xsd:element>
        <xsd:element name="name" Wireless Keyboard></xsd:element>
        <xsd:element name="isUserTypeAuthRequired"
        FALSE></xsd:element>
        <xsd:element name="state" available></xsd:element>
    </xsd:element>
    <xsd:element name="pfInfo">
        <xsd:element name="pfp" wifiSerialBus></xsd:element>
        <xsd:element name="id" 34567"></xsd:element>
        <xsd:element name="name" Wireless Mouse></xsd:element>
        <xsd:element name="isUserTypeAuthRequired"
        FALSE></xsd:element>
```

TABLE 1-continued

```
        <xsd:element name="state" available></xsd:element>
    </xsd:element>
</xsd:element>
```

Now, if 'wifiDisplay' is the value of 'service_information_request' from WD, the ASP in WDC filters the 'preassociationServiceDiscovery' having only information about PFP 'wifiDisplay', and sends the filtered 'service_information' to WD ASP in Service Discovery Response. The example filtered 'service_information' is shown below in Table 2.

TABLE 2

```
<xsd:element name="preassociationServiceDiscovery">
    <xsd:element name="deviceType" wdc></xsd:element>
    <xsd:element name="deviceName" Wireless docking
    for basic office></xsd:element>
    <xsd:element name="available" TRUE></xsd:element>
    <xsd:element name="optionalFeature"
    userTypeAuthentication></xsd:element>
    <xsd:element name="optionalFeature"
    specificPfSelection></xsd:element>
    <xsd:element name="optionalFeature"
    vicinityUndocking></xsd:element>
    <xsd:element name="optionalFeature"
    multipleDockees></xsd:element>
    <xsd:element name="pfInfo">
        <xsd:element name="pfp" wifiDisplay></xsd:element>
        <xsd:element name="id" 12345"></xsd:element>
        <xsd:element name="name" TV screen></xsd:element>
        <xsd:element name="isUserTypeAuthRequired"
        FALSE></xsd:element>
        <xsd:element name="state" occupied></xsd:element>
        <xsd:element name="wdName" Mim's tablet></xsd:element>
        <xsd:element name="shareable" FALSE></xsd:element>
    </xsd:element>
</xsd:element>
```

If the 'service_information_request' includes any optional feature instead, the ASP in WDC checks if the WDC supports the optional feature, and provide matching 'service name' and corresponding 'service_information' in the Service Discovery Response only if the WDC supports the mentioned optional feature. As for example, if 'multipleDockees' is the value of 'service_information_request' from WD, the ASP in WDC checks if one 'optionalFeatureName' in 'preassociationServiceDiscovery' element has 'multipleDockees' as value.WDC sends the 'preassociationServiceDiscovery' element as 'service_information' parameter in Service Discovery Response message, only if there is match (i.e., one 'optionalFeatureName' in 'preassociationServiceDiscovery' element has 'multipleDockees' as value).

Post-Association PF Investigation (PF Query)

Upon successful completion of pre-association discovery, connection setup and ASP session setup phases, the WD#1 sends a GetPfInfo Request to the WDC to know the information about different PFs associated with the WDC. The WD can indicate its PFP capability or PFP of interest (e.g., list of supported PFPs—'wifiDisplay', 'wifiSerialBus', etc.) in the request. In response, the WDC sends back a GetPfInfo Response with PF information. In case, the request included supported PFP(s) by the WD, the WDC filters PF information accordingly and includes only those PFs that use the PFPs in the response. In essence, the WDC filters 'peripheralFunctionInfoList' element based on the supported PFP(s) mentioned in the request. An example of filtering based on WD capability/interest is shown above in terms of XML elements. The PF information includes the list of associated PF services by using 'peripheralFunctionInfoList' elements. Here, the information indicates that TV set, wireless headset, wireless keyboard, audio system, wireless mouse, media storage and printer are available ('available') for docking. If such detailed PF information is already made available by the WDC in pre-association discovery message, the WD#1 may skip performing PF Query procedure, and starts PF Selection procedure as outlined below. In the pre-association discovery phase, a WDC may include the states of associated PFs by including 'peripheralFunctionState' ('available', 'occupied', etc.) for each PF in 'preassociationServiceDiscovery', which is carried as service_information parameter in AdvertiseService( ) method.

PF Selection and Service Setup by WD#1

After the WD#1 knows the availability of PFs associated with the WDC, it sends PfSelection Request including desired PFs for connection. The request encloses the desired set of PFs by using multiple 'pfSelection' elements (one for each desired PF) and setting the value of the 'pfSelectionStyle' action argument to 'specific'. In this example case, the desired PFs are TV set, wireless headset, wireless keyboard, media storage and printer. In response, the WDC acknowledges the acceptance of the request by transmitting back the PfSelection Response to the WD. Upon the successful completion of the PF selection, the WD#1 and the WDC perform PF Service Setup for selected PFs (TV set, wireless headset, wireless keyboard, media storage and printer).

Another WD (WD#2) Initiates Docking

While WD#1 is docked and using the selected PFs, another dockee (WD#2) initiates docking with the same WDC. Upon successful completion of pre-association discovery (both WDC and WD can indicate its capability/interest during pre-association discovery, as described above), connection setup and ASP session setup phases, the WD#2 sends a GetPfInfo Request to the WDC to know the information about different PFs associated with the WDC. Here, WD#2 can again include its capabilities in terms of the supported PFPs (e.g., 'wifiDisplay', 'wifiSerialBus') in the request, so that the WDC can filter the 'peripheralFunctionInfoList' element accordingly and provide filtered information only about relevant PFs in response. An example of filtering based on WD capability/interest is shown above in terms of XML elements. In response, the WDC sends back a GetPfInfo Response with PF information. Here, the information indicates that audio system, wireless mouse, media storage and printer are available ('available') for docking, while TV set, wireless headset and wireless keyboard are being used by WD#1 (occupied). The name of WD#1 in the 'wdName' element under 'peripheralFunctionSimpleInfo' or 'peripheralFunctionDetailedInfo' indicates who is using the 'occupied' PFs.

PF Selection by WD#2

After WD#2 knows about the availability of the PFs, it sends a PfSelection Request including desired PFs for connection. The request encloses the desired set of PFs by using multiple 'pfSelection' elements (one for each desired PF) and setting the value of the 'pfSelectionStyle' action argument to 'specific'. In this example case, the desired PFs are audio system, wireless mouse, media storage and printer. In response, the WDC acknowledges the acceptance of the request by transmitting back the PfSelection Response to the WD. Alternatively, WD#2 can set 'pfSelectionStyle' action argument to 'all', where 'all' means all available PFs.

Notification to WD#1 Indicating Change of PF Status Due to Docking of WD#2

The allocation of selected non-shareable PFs (audio system and wireless mouse) for WD#2 changes their state from 'available' to 'occupied'. The state change invokes PF Info List Change Notification to WD#1. If WD#1 informed its capability or interest in terms of e.g., the supported PFPs (e.g., 'wifiDisplay', 'wifiSerialBus') to the WDC (during pre-association discovery or PF Query procedure), the WDC filters the information accordingly to customize the notification, so that it only carries information about change of states of only the PFPs supported by the WD#1. If the PFP(s) expressed by the WD#1 as capability/interest do not match with the PFP(s), whose status changed, the WDC do not send PF Info List Change Notification to WD#1.

PF Service Setup by WD#2

Upon the successful completion of the PF selection, the WD#2 and the WDC perform PF Service Setup for selected PFs (audio system, wireless mouse, media storage and printer).

Releasing PF (PF De-Selection) by WD#1

Later on, WD#1 releases keyboard by sending a PfDeselection Request to the WDC. The request includes a 'pfDeselection' action argument for keyboard. In response, the WDC acknowledges the acceptance of the request by sending back the PfDefelection Response to the WD.

Notification to WD#2 Indicating Change of PF Status Due to PF De-Selection by WD#1

The de-selection of keyboard by the WD#1 changes the state of the PF from 'occupied' to 'available', and the state change invokes PF Info List Change Notification to WD#2, provided that the list of PFPs expressed by WD#2 as capability/interest include the PFP for keyboard. If WD#2 informed its capability or interest in terms of e.g., the supported PFPs (e.g., 'wifiDisplay', 'wifiSerialBus') to the WDC (during pre-association discovery or PF Query procedure), the WDC filters the information to customize the notification, so that it only carries information about change of states of only the PFPs supported by the WD#2.

Selection of Keyboard by WD#2

Upon dynamically noting that the keyboard is available in the PF Info Change Notification, WD#2 sends a PfSelection Request using a 'pfSelection' element and setting the value of the 'pfSelectionStyle' action argument to 'specific'. In response, the WDC acknowledges the acceptance of the request by transmitting back the PfSelection Response to the WD.

Various cases regarding the (competing) requests for a peripheral that is released are discussed later under the headings "Resolving multiple selection request for the same PF" and "Request for relinquishing a PF being used by other WD".

Notification to WD#1 Indicating Change of Keyboard Status Due to Selection by WD#2

The allocation of keyboard for WD#2 changes the state of the PF from 'available' to 'occupied'. The state change invokes PF Info List Change Notification to WD#1, provided that the list of PFPs expressed by WD#1 as capability/interest include the PFP for keyboard. If WD#1 informed its capability in terms of the supported PFPs (e.g., 'wifiDisplay', 'wifiSerialBus') to the WDC (during pre-association discovery or PF Query procedure), the WDC customizes the notification so that it only carries information about change of states of only the PFPs supported by the WD#1.

PF Service Setup for Keyboard by WD#2

Upon the successful completion of the PF selection, the WD#2 and the WDC perform PF Service Setup for keyboard.

Undocking by WD#1, Corresponding Notification to WD#2 Indicating Change of PF Status, and PF Selection and Service Setup by WD#2 for Newly Available PF At some point later, the WD#1 performs Docking Session Teardown.

The session teardown by the WD#1 changes state of TV set and wireless headset from 'occupied' to 'available', and the state changes invoke PF Info List Change Notification to WD#2, provided that the list of PFPs expressed by WD#2 as capability/interest include the PFP for TV set and/or wireless headset. If WD#2 informed its capability in terms of the supported PFPs (e.g., 'wifiDisplay', 'wifiSerialBus') to the WDC (during pre-association discovery or PF Query procedure), the WDC customizes the notification so that it only carries information about change of states of only the PFPs supported by the WD#2. As the user of WD#2 wants to use wireless headset, WD#2 selects it for use and sets up PF service for the headset by using PF selection and PF Service Setup procedure respectively.

Undocking by WD#2

At some point later, the WD#2 performs Docking Session Teardown.

Resolving Multiple Selection Request for the Same PF

In case, multiple such PfSelection Requests for the same PF(s) are received by the WDC from different WDs, the WDC needs to resolve who gets the PF. Information flow for resolving such conflicting requests are shown in FIGS. 6.1, 6.2, and 6.3 in terms of different options described below. In the figures, it is assumed that keyboard is available (e.g., released by WD#1), and WD#2 and WD#3 send request for selecting keyboard for connection.

FIG. 6.1 illustrates an example information flow for resolving multiple selection requests for the same PF, illustrates an example Implementation option 1—Keyboard is allocated to WD#2, as the request from WD#2 came first, in accordance with an example embodiment of the invention. Alternatively, the WDC can determine the winning WD based on an algorithm weighting on additional information provided in PfSelection Request by respective WDs. As for example, the PfSelection Request can include the level of desire for the PF and/or expected duration of use (e.g., time period) of the desired PF. The level of desire can be expressed between limited options (e.g., badly needed, nice to have), or it could be any value between e.g., 1 and 5, where 5 stands for critical need. Depending on the algorithm implemented in the WDC, it can allocate the PF to the WD that expressed highest level of desire or wanted to use the PF for the shortest time. Besides, the WDC can also be pre-configured to prioritize PfSelection Request from specific WD(s). As for example, there can be a hierarchy, so that the owner of the WDC gets the highest priority, or parents get highest priority followed by children and guests in a home docking solution, or the manager gets highest priority followed by assistant manager and other subordinates in meeting room docking solution. In any case, the WDC sends PfSelection Response to all the WDs that requested the PF, and the WD that got the PF receives response with success status, while the other WDs receives the failure status and optionally the reason of failure.

FIG. 6.2 illustrates an example information flow for resolving multiple selection requests for the same PF, illustrates an example Implementation option 2—Keyboard is allocated to WD#3, as its level of desire is higher, in accordance with an example embodiment of the invention.

FIG. 6.3 illustrates an example information flow for resolving multiple selection requests for the same PF, illustrates an example Implementation option 3—Keyboard is allocated to WD#2, as it is prioritized as the owner, in accordance with an example embodiment of the invention.

FIGS. 6.1, 6.2, and 6.3 are just example implementation cases where weights on different factors in the WDC algorithm can vary, depending on priority/interest of the user/owner of a specific WDC. The winner WD is expected to setup PF Service as a follow-up, as shown in FIG. 4.1.

Request for Relinquishing a PF being Used by Other WD

A WD can also request to relinquish one or more PFs that are already in use by another WD for its own use. This procedure includes two new messages defined in this invention report: PF Relinquish Request message (see FIG. 7.1) and PR Relinquish Response message (see FIG. 7.2).

FIG. 7.1 illustrates an example PF Relinquish Request Message Structure, in accordance with an example embodiment of the invention.

FIG. 7.2 illustrates an example PF Relinquish Response Message Structure, in accordance with an example embodiment of the invention.

Figure 8:
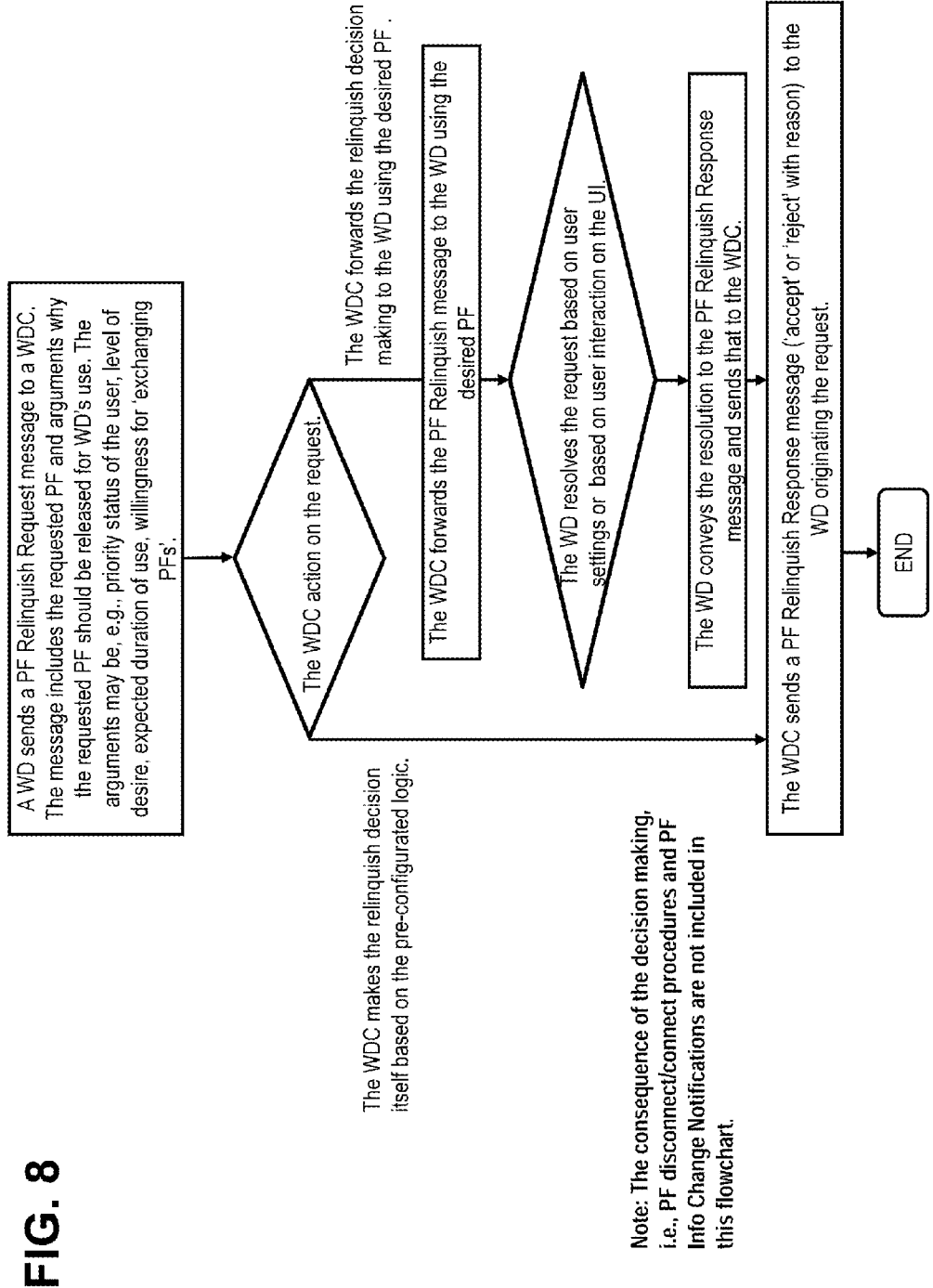
FIG. 8 illustrates an example flow diagram of an example technical implementation of PF Relinquish procedure, in accordance with an example embodiment of the invention.

FIG. 8 illustrates an example flow diagram of an example technical implementation of PF Relinquish procedure, in accordance with an example embodiment of the invention. An example of the generic technical implementation of the PF Relinquish procedure in the form of flowchart is shown in FIG. 8. The different variants to perform relinquishing a PF are detailed in the following:

Through the WDC

The WD sends a PF Relinquish Request message to WDC to indicate the level of desire and/or expected duration of use for specific PF(s). The level of desire can be expressed between limited options (e.g., badly needed, nice to have), or it could be any value between e.g., 1 and 5, where 5 stands for critical need. Moreover, the WD can also indicate its willingness to make a PF (that she is using now) available for the WD who is using the desired PF—this indication can be called with a term "exchanging PF". As for example, the WD can indicate that she would give audio set, if the other WD makes headset available for her. Depending on the logic implemented in the WDC, either WDC forwards the request to the WD (who is using the desired PF) for resolving the request, or the WDC makes the resolution by itself based on pre-configured logic. The information in the request can be used to resolve the request. As for example, the request can be accepted, if the level of desire is high or expected duration of use is low. The WD can resolve the request without user action based on user settings or based on user interaction on the UI. The willingness to make an alternate PF available (beside other information) can be shown to the user of the WD who is using the desired PF, if user interaction is used. If the WD accepts the request, it conveys the decision to the WDC in response message, the WDC disconnects the PF from the WD, and offers the newly available PF only to the WD that made the original request. Another alternative is that the WDC resolves the request by temporarily allocating the requested PF to the WD without asking the WD currently using the PF. This decision assumes that the WDC has consent from the WD to (temporarily) release a peripheral originally allocated to the WD. For example, as part of the capability negotiation between WD and WDC, the WD may indicate that a PF may be (temporarily) released if not used for certain minutes, and to be brought back immediately when needed in the original use or after a pre-defined time of 'borrowing' the PF. Besides, the WDC can also be configured that if a request is coming from specific WD(s), it would be accepted right away. As for example, the configuration can be based on a hierarchy mentioned above. If the WDC accepts the request, it informs the reason of disconnecting the PF to the WD who was using it. If the request was rejected (by either WD or WDC), the reason of rejection is conveyed to the requesting WD in the response.

FIGS. 9.1 and 9.2 show example information flow for resolving relinquish request by the WDC. Here, WD#2 wants headset that is currently being used by WD#1. FIG. 9.1 illustrates an example information flow for resolving PF Relinquish request by the WDC, the case where WD#2 indicates its willingness to exchange PF, in accordance with an example embodiment of the invention. The WD#2 indicates the desired PF (headset), level of desire ("badly needed"), expected duration of use (30 min) and willingness to make another PF (audio set) available for WD#1 (exchanging PF) in the Relinquish Request. The WDC accepts the request (e.g., based on pre-configured logic, as the request came from the owner or with very high level of desire), and disconnects headset from WD#1 and audio set from WD#2. The WDC also sends PF Info List Change Notification to WD#1 (indicating that headset is disconnected and audio set is available) and WD#2 (indicating that audio set is disconnected and headset is available). The WDC also sends Relinquish Response to the WD#2 indicating that the desired PF headset is now selected for WD#2. Alternatively, the WDC just indicates to WD#2 in the Relinquish Response message that the headset is relinquished (but not selected automatically by the WDC for the WD#2). In this option the WD#2 then sends separate PfSelection Request to select the headset for WD#2, to which WDC responses with PfSelection Response message (shown as dotted lines). As a follow-up, WD#2 sets up PF service for headset, as shown in FIG. 4.1. WD#1 can also send a PfSelection Request to select the offered audio set for WD#1, followed by a PfSelection Response from WDC, and PF Service set up for audio set.

FIG. 9.2 illustrates an example information flow for resolving PF Relinquish Request by the WDC, simplified case where WD#2 does not indicate its willingness about exchanging PF, in accordance with an example embodiment of the invention.

FIGS. 10.1 and 10.2 show cases, where the Relinquish Request is forwarded by the WDC to the peer WD (WD#1 here) for resolution. FIG. 10.1 illustrates an example information flow for resolving PF Relinquish Request through WDC, the case where WD#2 indicates its willingness to exchange PF, in accordance with an example embodiment of the invention. Here, the WD#1 accepts request, and may disconnects from the headset, if it was directly connected to WD#1. Then, WD#1 sends to the WDC a Relinquish Response message that might already indicate de-selection has taken place. Alternatively, WD#1 may disconnect from the headset by sending a separate PfDeselection Request to the WDC. The order of Relinquish Response and PfDeselection Request from WD#1 may depend on implementation. The WDC forwards the Relinquish Response message to WD#2, where it may be indicated that the headset is selected for WD#2. Alternatively, the WDC just indicates to WD#2 in the Relinquish Response message that the headset is relinquished (but not selected automatically by the WDC for the WD#2). In this option the WD#2 sends separate PfSelection Request to select the headset for WD#2 (shown as dotted lines). As a follow-up, WD#2 sets up PF service for headset, as shown in FIG. 4.1. If the WD#1 decided to connect to the offered audio set, it sends a PfSelection Request to the WDC. That triggers disconnection of audio set from WD#2 by WDC, and corresponding PF Info List Change Notification to WD#2.

FIG. 10.2 illustrates an example information flow for resolving PF Relinquish Request through WDC, simplified case where WD#2 does not indicate its willingness about exchanging PF, in accordance with an example embodiment of the invention.

Directly to WD

The WD establishes direct connection with the WD that is using the desired PF over BT, Wi-Fi or cellular radio. Device discovery and connection establishment follow generic procedures of the respective radio bearers. The identification and/or name of the WDC (to which both the WDs are connected) can be used while establishing the connection, so that the peer WD understands the reason for connection establishment. Besides, a specific value of a parameter in a discovery or a connection/session establishment message can be used to explicitly indicate the purpose of communication. Specific message is sent to request the WD (that is using the desired PF) to relinquish the desired PF. The request may include level of desire and/or duration of use, as described above. Moreover, the WD can also indicate its willingness to make a PF (that she is using now) available for the WD who is using the desired PF, as mentioned above. In response, the WD (that is using the desired PF) can accept the request and disconnects from the PF, where the decision is based on pre-configuration, user setting, or user interaction. The WDC is guided to reserve the released PF only to the WD that requested the PF through the Direct WD-to-WD process.

FIGS. 11.1 and 11.2 show two cases where Relinquish Request is directly sent to peer WD for resolution. FIG. 11.1 illustrates an example information flow for resolving PF Relinquish Request directly between WDs, the case where WD#2 indicates its willingness to exchange PF, in accordance with an example embodiment of the invention. The Relinquish Request is sent over newly established BT or Wi-Fi connection between the WDs. Here, WD#1 accepts request, and sends a Relinquish Response message to WD#2. This message might already indicate that de-selection of the headset has taken place if the WD#1 has made the disconnection to a PF it was directly connected to. WD#1 may disconnect from the headset by sending PfDeselection Request message to the WDC. The PfDeselection Request message also indicates to the WDC that the PF should be reserved for WD#2. WD#2 also sends PfDeselection Request message for audio set to the WDC. The WDC sends corresponding PF Info List Change Notifications to WD(s) of the de-selections. The WDs consequently send PfSelection Requests for their desired PFs. The WDs also follow-up with PF Service setup as shown in FIG. 4.1 (not shown in FIG. 11).

FIG. 11.2 illustrates an example information flow for resolving PF Relinquish request directly between WDs, simplified case where WD#2 does not indicate its willingness about exchanging PF, in accordance with an example embodiment of the invention.

To the User

Figure 12:
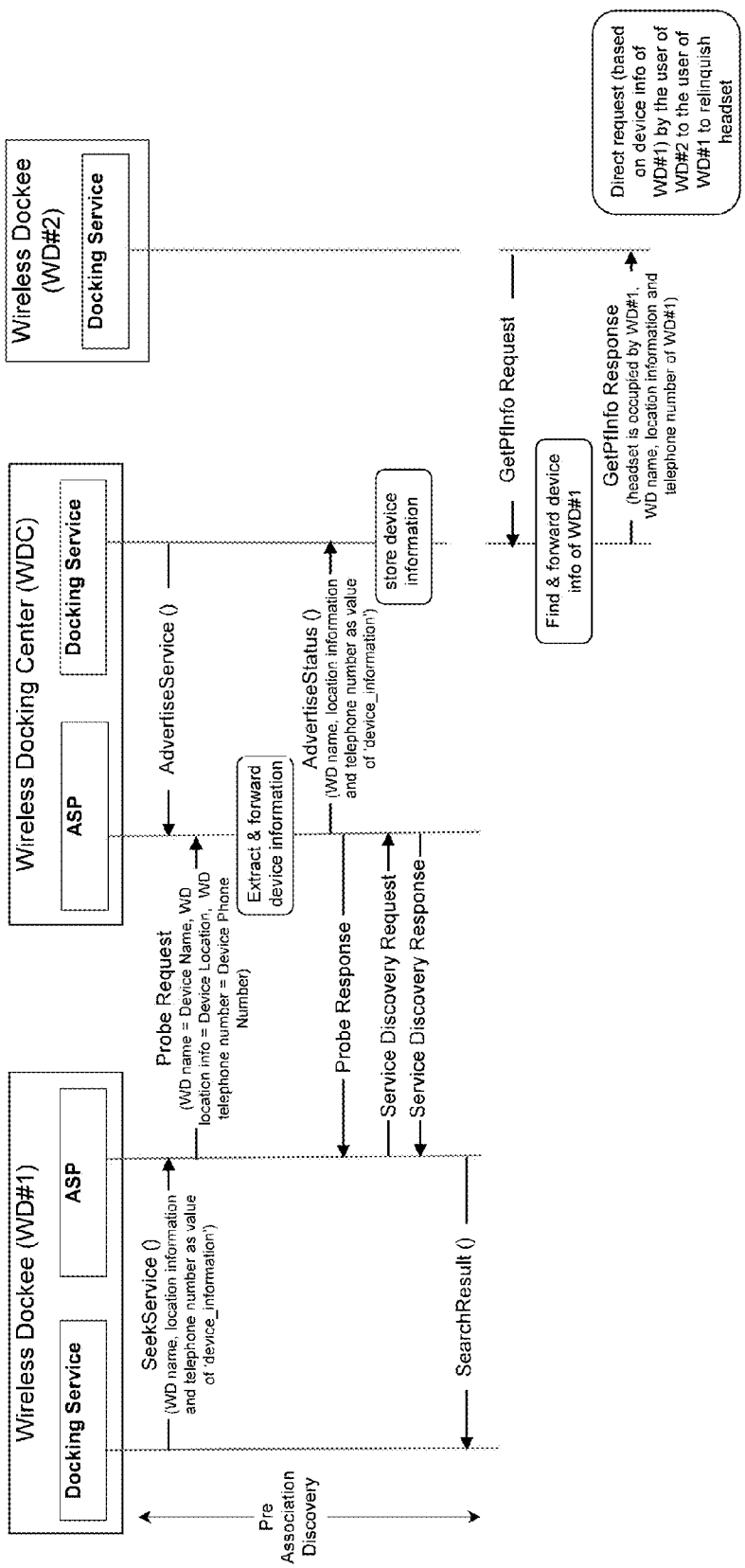
FIG. 12 illustrates an example information flow for enabling relinquish request directly between users, in accordance with an example embodiment of the invention.

FIG. 12 illustrates an example information flow for enabling relinquish request directly between users, in accordance with an example embodiment of the invention. The user of the WD (desiring a PF) makes a human request to the user of the WD (that is using the desired PF) to relinquish the desired PF. In this case, the information in the GetPfInfo Response for the WD desiring a PF is used to distinguish the WD or user of the WD that is using the desired PF. In the example case shown in FIG. 12 the WD#1 first docks with WDC to connect with headset and other PFs. While WD#1 is performing pre-association discovery for docking, the Docking Service in WD#1 sends device information as value of newly proposed 'device_information' parameter in SeekService( ) method to the ASP in WD#1. Alternatively, new method can be defined to carry 'device_information' to the ASP or ASP is collecting 'device_information' itself from different applications in the same WD. The device information can include user friendly name of WD#1, location information (e.g., geocoordinates, other location data) of the WD#1 and/or telephone number of the WD#1), and these information can be expressed in terms of XML element as shown in the Table 3:

TABLE 3

```
<device>
    <deviceType>urn:schemas-wifialliance-org:device:WD:1</deviceType>
    <wdName>short user-friendly title</wdName>
    <locationInforamtion>geolocation coordination</ locationInformation >
    <phoneNumber>+358123456789</ phoneNumber >
</device>
```

The ASP in WD#1 forwards the 'device_information' to the ASP in WDC over the Probe Request. The existing 'Device Name' attribute carries 'wdName', while newly proposed attributes 'Device Location' and 'Device Phone Number' carry 'locationInformation' and 'phoneNumber'. Upon receiving such device information, the ASP in WDC sends AdvertiseStatus event to Docking Service in WDC, and 'device_information' parameter is used to carry device information as XML elements as shown above. Alternatively, the 'device_information' can be carried from ASP in WDC to the Docking Service in the WDC over a new method (i.e., different from the AdvertiseStatus). The Docking Service in WDC stores the device information of WD#1 at least for the duration of the whole docking session of WD#1. Later on, WD#2 initiates docking with the same WDC, and sends GetPfInfo Request to the WDC. Other information flow between WD#2 and WDC are not shown in the figure for simplicity. Upon receiving the GetPfInfo Request, the WDC sends back GetPfInfo Response to indicate that headset is already 'occupied' by WD#1. The WDC also includes the device information of WD#1 in terms of XML elements. Upon receiving the response, the Docking Service in the WD#2 indicates to the user that headset is 'occupied' by WD#1, and device information of the WD#1 is also shown on the UI. The user of the WD#1 now can make direct request to the user of WD#1 (based on the received device information of WD#1) for relinquishing headset for her. As for example, the user of WD#2 can find the WD#1 e.g., by using an (indoor) map or can make a call or send an SMS message to place a human request to the user of WD#1 for relinquishing the desired PF. If the user of WD#1 accepts the request, she disconnects the headset on the UI, and WD#1 sends PfDeselection Request to the WDC for disconnecting headset. Upon successful de-selection of headset, the WDC notifies the WD#2 (in PF Info List Change Notification) about the availability of headset, and WD#2 can then send PfSelection Request for connecting to headset. These de-selection, notification and selection procedures follow the post PF Relinquish Response information flow shown in FIG. 11.2 (not shown in FIG. 12).

The information flows between WD(s) and the WDC (described above) would be meaningful, if they are conveyed appropriately to a user for information and interaction. Example WD UI and possible user interactions in the multiple dockee cases are described below.

Figure 13:
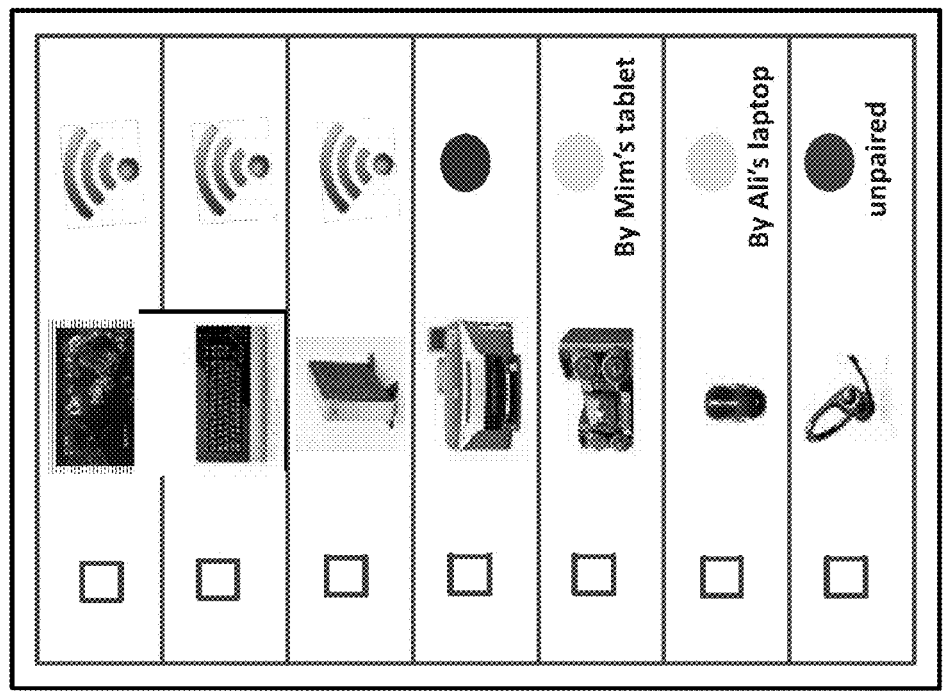
FIG. 13 illustrates an example an example WD user interface (UI) with multiple dockees, in accordance with an example embodiment of the invention.

FIG. 13 illustrates an example WD user interface (UI) with multiple dockees, in accordance with an example embodiment of the invention. The UI in WD, corresponding user actions and follow-up working procedure can be designed to enable a user to understand the situation/status and react with simple and easy steps based on the user need.

The PFs associated with the WDC, with which a WD is docked with, can be shown on the WD UI using the following easily understandable logic:

All the PFs already connected with the same WD are listed on the top, having a symbol/icon (e.g., wireless connection) beside each PF, to indicate that the PFs are already in use by the WD. By tapping or clicking on a PF, the user can initiate the de-selection (dis-connection) of that particular PF. Alternatively, when the user selects a specific PF, the option for PF de-selection can pop-up on the UI.

All the available PFs can be listed with e.g., a green symbol/icon beside, to indicate to the user that the user can connect with the PF if she wants. By tapping or clicking on an available PF, the user can initiate the selection of that particular PF for connection. Alternatively, when the user selects a specific PF, the option for PF connection can pop-up on the UI.

All the PFs that are connected with other WD(s) can be listed with e.g., a yellow symbol/icon beside, to indicate to the user that he cannot directly connect with the PF. There can be additional information beside each PF to indicate who is using the PF. If the user wants to use it, she can tap or click the PF to send a request to the WD (who is using it) to relinquish the PF. As said before, the request can be sent through WDC or directly to the WD if the required information is available. Alternatively, when the user selects a specific PF, the option for requesting PF can pop-up on the UI. The user can of course use interactive approach of directly requesting the user of the WD, that is using the PF, to relinquish the PF based on user friendly name of the WD made available by the WDC and shown on the UI. If the WD who is using the PF, based on configuration or user setting, or its user directly accepts the request to relinquish the PF by deselecting/disconnecting the PF, the status of the PF would be changed to green, and then the WD requesting the PF can initiate the PF selection process for connection. If the process succeeds, the status of the PF would change again, and would be shown with wireless connection symbol, as mentioned above.

All the PFs that are not available for some other reason (e.g., unplugged, unpaired, sleeping) can be listed with e.g., a red symbol/icon beside, to indicate to the user that the WD cannot connect with the PF. There can be additional information next to each PF to indicate why the PF is not available If the user wants to use it, she can take appropriate step (e.g., start charging, plug to energy source, pair) to make the PF available first. Once available, the status would change to green, and user can connect with the PF as described above.

To enable making the same request for multiple PFs, the UI might have selection button behind each PF. To avoid any unexpected user request (possibly due to false tap/click/selection of PF on the UI), the WD can ask the user to confirm the action in terms of a pop-up on the UI. When a user makes a request (e.g., connection, deselection, relinquish) by tapping/clicking/selecting a PF on the UI, the status can start blinking/flashing to indicate that the follow-up process for the request is going on, and once the process is successfully complete, the status symbol/icon is changed on the UI.

Besides the above mentioned request, a user might be able to make a proactive request to query if there is any latest update of the status of a peripheral. The UI might be designed to provide an option to a user for making such proactive request, so that when a user selects a peripheral on UI (e.g., click, touch or flick on the icon of the peripheral), a pop-up window opens up with multiple options, where one option is for initiating the proactive request to query the peripheral, when selected. Upon making such request, the WD initiates the PF or WDN query procedure, depending on which PFs are selected. When the request is followed-up, the icon/symbol can be keep on blinking/flashing until the request-follow-up process is finished, as described above. The WDC is anticipated to provide status update about associated PFs and WDNs in automated manner, whenever there is any change in status. However, a WDC may provide such update only after certain interval to optimize traffic. A WDC may also wait to bundle multiple updates. User initiated proactive request is anticipated to complement automated update, when a user is in need of a specific PF or WDN.

FIG. 14A illustrates an example network diagram and functional block diagram of an example wireless docking center device and an example wireless dockee device, in accordance with an example embodiment of the invention.

The wireless docking center device WDC may include a processor 122, which includes a dual core or multi-core central processing unit 124 and 125, a random access memory (RAM) 126, a read only memory (ROM) 127, and interface circuits 128 to interface with one or more radio transceivers 208, battery or mains power 145 and optionally other power sources. In an example embodiment of the invention, the wireless docking center device WDC may also optionally include one or more of a key pad, touch screen, display, microphone, speakers, ear pieces, camera or other imaging devices, etc. The RAM and ROM may be removable memory devices 144, such as smart cards, SIMs, WIMs, semiconductor memories such as RAM, ROM, PROMS, flash memory devices, etc.

In accordance with an example embodiment of the invention, either or both of the wireless dockee device WD#1 and the wireless docking center device WDC may include one or both of a Bluetooth Low Energy (LE) proximity detector. They may optionally also include an NFC detector 213 for enabling basic docking, initiation and pairing between devices.

Example embodiments of the wireless docking center program 142, application 200, WLAN stack 203, and Bluetooth stack 205 may be computer code instructions stored in the RAM and/or ROM memory of the processor 122, which when executed by the central processing units (CPU), carry out the functions of the example embodiments of the invention. The gathered peripheral information buffer 146 buffers the peripheral information received from the one or more wireless peripheral devices 120A-H, for example power related information characterizing battery power of a battery powering the one or more wireless peripheral devices. The gathered peripheral information buffer 146 may be a partition in the RAM memory 126 of the processor 122. The wireless docking center device WDC and the wireless dockee device WD#1 may communicate with one another via the wireless communication 115A, using one or more example communications protocols such as the Bluetooth communications protocol, Bluetooth LE communications protocol, and the IEEE 802.11 wireless LAN (WLAN) and Wi-Fi Direct protocols.

The example wireless dockee device WD#1 is shown optionally including similar components to those described for the example wireless docking center device WDC. An example embodiment of the wireless dockee program 142', may be computer code instructions stored in the RAM and/or ROM memory of the processor 122', which when executed by the central processing units (CPU), carry out the functions of the example embodiments of the invention. A Bluetooth Low Energy (LE) RF emitter or proximity detector 212 may be included in the dockee device 110, using the Bluetooth LE protocol.

FIG. 14B illustrates an example network diagram and functional block diagram of the example wireless docking center device and an example wireless peripheral device, in accordance with an example embodiment of the invention. Not all peripheral devices are necessarily equipped with all the components shown in the figure, and some peripheral devices may be connected by wire to the wireless docking center device. The example wireless peripheral device 120A-H is shown optionally including similar components to those described for the example wireless docking center device WDC. An example embodiment of the wireless peripheral program 142", may be computer code instructions stored in the RAM and/or ROM memory of the processor 122", which when executed by the central processing units (CPU), carry out the functions of the example embodiments of the invention. The wireless docking center device WDC and the wireless peripheral device 120A-H may communicate with one another via the wireless communication 115B, using example communications protocols such as the Bluetooth communications protocol, Bluetooth LE communications protocol, and the IEEE 802.11 wireless LAN (WLAN) and Wi-Fi Direct protocols.

In accordance with an example embodiment of the invention, a Bluetooth Low Energy (LE) proximity detector 212 may be included in the wireless peripheral device 120A-H, using the Bluetooth LE protocol to detect the proximity of a Bluetooth LE RF emitter or proximity detection tag possessed by the user. In accordance with an example embodiment of the invention, a proximity detector unit 214 may be used to detect the proximity of the user. The wireless peripheral device 120A-H may optionally also include an NFC detector 213 for enabling basic docking FIG. 14C illustrates an example network diagram and functional block diagram of wireless dockee device WD#1 and the wireless peripheral device 120A-H, in accordance with an example embodiment of the invention. The wireless dockee device WD#1 and the wireless peripheral device 120A-H may communicate with one another via the wireless communication 115C, using one or more example communications protocols such as the Bluetooth communications protocol, Bluetooth LE communications protocol, and the IEEE 802.11 wireless LAN (WLAN) and Wi-Fi Direct protocols.

Using the description provided for the several example embodiments disclosed herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes may be made to the specific example embodiments without departing from the spirit and scope of the invention.

What is claimed is:

1. A method, comprising:
    allocating, by a wireless docking center device, at least one peripheral function associated with a peripheral device, from a plurality of available peripheral functions associated with one or more peripheral devices, to a first wireless dockee device;
    receiving, by the wireless docking center device, a request message for available peripheral functions from a second wireless dockee device;
    providing, by the wireless docking center device to the second wireless dockee device, a list of available peripheral functions associated with one or more peripheral devices, excluding the at least one peripheral function allocated to the first wireless dockee device;
    receiving, by the wireless docking center device, a selection request from the second wireless dockee device to select at least one of the available peripheral functions associated with one or more peripheral devices, excluding the at least one peripheral function allocated to the first wireless dockee device;
    allocating, by the wireless docking center device, the requested at least one of the available peripheral functions associated with one or more peripheral devices, to the second wireless dockee device; and
    transmitting, by the wireless docking center device, a change notification to the first wireless dockee device indicating that the requested at least one of the available peripheral functions associated with one or more peripheral devices, allocated to the second wireless dockee device is no longer available in response to the allocation of said requested at least one peripheral function to the second wireless dockee device.

2. The method of claim 1, wherein the received request message for available peripheral functions includes information characterizing capabilities and/or interests regarding the second wireless dockee device.

3. The method of claim 1, further comprising:
    determining, by the wireless docking center device, whether any of the at least one allocated peripheral functions to the first wireless dockee device is shareable; and
    including, by the wireless docking center device, the at least one shareable peripheral function in the list of available peripheral functions to the second wireless dockee device.

4. The method of any of the claims 1, further comprising:
    receiving, by the wireless docking center device, a relinquish request message from the second wireless dockee device, requesting that the first wireless dockee device relinquish its use for the at least one allocated peripheral function, the relinquish request message including information supporting the relinquish request;
    analyzing, by the wireless docking center device, the information supporting the relinquish request, and considering configured settings including any conditions set by the first wireless dockee device to relinquish the requested peripheral function;
    determining, by the wireless docking center device, to relinquish the requested peripheral function of the first wireless dockee device to the second wireless dockee device, based on the analysis;
    disconnecting, by the wireless docking center device, the first wireless dockee device from the requested peripheral function to make the peripheral function available for the second wireless dockee device, in response to the determination; and
    transmitting, by the wireless docking center device, a relinquish response message to the second wireless dockee device, indicating availability or direct allocation of the requested peripheral function for the second wireless dockee device, based on the analysis.

5. The method of claim 4, wherein the information supporting the relinquish request includes at least one of an indication of need for the requested peripheral function, a priority of the second wireless dockee device, an indication of a duration of the proposed use of the requested peripheral function, or an offer to exchange another peripheral function for the requested peripheral function; and
    wherein the conditions set by the first wireless dockee device to relinquish the peripheral function include at least one of no conditions, never relinquish the peripheral function while docked, allowing use of the relinquished peripheral function for a pre-defined time before release back to the first wireless dockee device, allowing use of the relinquished peripheral function until the first wireless dockee device re-starts use the peripheral function.

6. A method, comprising:
    transmitting, by a first wireless dockee device, a request message for at least one peripheral function associated with a peripheral device, from a plurality of available peripheral functions associated with one or more peripheral devices, to a wireless docking center device;
    receiving, by the first wireless dockee device, an allocation for the requested peripheral function associated with a peripheral device, from the wireless docking center device in response to the request message; and
    receiving, by the first wireless dockee device, a change notification indicating that at least one of the available peripheral functions associated with one or more peripheral devices, is no longer available in response to allocation of said at least one peripheral function associated with one or more peripheral devices, to a second wireless dockee device.

7. The method of claim 6, wherein the transmitted request message for available peripheral functions includes information characterizing capabilities and/or interests regarding the first wireless dockee device.

8. The method of claim 7, wherein the characteristic information includes a characteristic of the requested peripheral function, a level of need for the peripheral function, an expected duration of use of the peripheral function, and a priority of the first wireless dockee device.

9. A computer program product comprising computer executable program code recorded on a computer readable, non-transitory storage medium, the computer executable program code, when executed by a computer processor, comprising:
   code for allocating, by a wireless docking center device, at least one peripheral function associated with a peripheral device, from a plurality of available peripheral functions associated with one or more peripheral devices, to a first wireless dockee device;
   code for receiving, by the wireless docking center device, a request message for available peripheral functions from a second wireless dockee device;
   code for providing, by the wireless docking center device to the second wireless dockee device, a list of available peripheral functions associated with one or more peripheral devices, excluding the at least one peripheral function allocated to the first wireless dockee device;
   code for receiving, by the wireless docking center device, a selection request from the second wireless dockee device to select at least one of the available peripheral functions associated with one or more peripheral devices, excluding the at least one peripheral function allocated to the first wireless dockee device;
   code for allocating, by the wireless docking center device, the requested at least one of the available peripheral functions associated with one or more peripheral devices, to the second wireless dockee device; and
   code for transmitting, by the wireless docking center device, a change notification to the first wireless dockee device indicating that the requested at least one of the available peripheral functions associated with one or more peripheral devices, allocated to the second wireless dockee device is no longer available in response to the allocation of said requested at least one peripheral function to the second wireless dockee device.

10. A computer program product comprising computer executable program code recorded on a computer readable, non-transitory storage medium, the computer executable program code, when executed by a computer processor, comprising:
   code for transmitting, by a first wireless dockee device, a request message for at least one peripheral function associated with a peripheral device, from a plurality of available peripheral functions associated with one or more peripheral devices, to a wireless docking center device;
   code for receiving, by the first wireless dockee device, an allocation for the requested peripheral function associated with a peripheral device, from the wireless docking center device in response to the request message; and
   code for receiving, by the first wireless dockee device, a change notification indicating that at least one of the available peripheral functions associated with one or more peripheral devices, is no longer available in response to allocation of said at least one peripheral function associated with one or more peripheral devices, to a second wireless dockee device.

11. An apparatus, comprising:
   at least one processor;
   at least one memory including computer program code;
   the at least one memory and the computer program code configured to, with the at least one processor, cause the apparatus at least to:
   allocate at least one peripheral function associated with a peripheral device, from a plurality of available peripheral functions associated with one or more peripheral devices, to a first wireless dockee device;
   receive a request message for available peripheral functions from a second wireless dockee device;
   provide to the second wireless dockee device, a list of available peripheral functions associated with one or more peripheral devices, excluding the at least one peripheral function allocated to the first wireless dockee device;
   receive a selection request from the second wireless dockee device to select at least one of the available peripheral functions associated with one or more peripheral devices, excluding the at least one peripheral function allocated to the first wireless dockee device;
   allocate the requested at least one of the available peripheral functions associated with one or more peripheral devices, to the second wireless dockee device; and
   transmit a change notification to the first wireless dockee device indicating that the requested at least one of the available peripheral functions associated with one or more peripheral devices, allocated to the second wireless dockee device is no longer available in response to the allocation of said requested at least one peripheral function to the second wireless dockee device.

12. The apparatus of claim 11, further comprising:
   the at least one memory and the computer program code configured to, with the at least one processor, cause the apparatus at least to:
   determine whether any of the at least one allocated peripheral functions to the first wireless dockee device is shareable; and
   include the at least one shareable peripheral function in the list of available peripheral functions to the second wireless dockee device.

13. The apparatus of claim 11, further comprising:
   the at least one memory and the computer program code configured to, with the at least one processor, cause the apparatus at least to:
   receive a relinquish request message from the second wireless dockee device, requesting that the first wireless dockee device relinquish its use for the at least one allocated peripheral function, the relinquish request message including information supporting the relinquish request;
   wherein the information supporting the relinquish request includes at least one of an indication of need for the requested peripheral function, a priority of the second wireless dockee device, an indication of a duration of the proposed use of the requested peripheral function, or an offer to exchange another peripheral function for the requested peripheral function;
   analyze the information supporting the relinquish request, and considering configured settings including any conditions set by the first wireless dockee device to relinquish the requested peripheral function;
   wherein the conditions set by the first wireless dockee device to relinquish the peripheral function include at least one of no conditions, never relinquish the peripheral function while docked, allowing use of the relinquished peripheral function for a pre-defined time before release back to the first wireless dockee device, allowing use of the relinquished peripheral function until the first wireless dockee device re-starts use the peripheral function;

disconnect the first wireless dockee device from the requested peripheral function to make the peripheral function available for the second wireless dockee device; and transmit a relinquish response message to the second wireless dockee device, indicating availability or allocation of the requested peripheral function for the second wireless dockee device, based on the analysis.

14. An apparatus, comprising:

at least one processor;

at least one memory including computer program code;

the at least one memory and the computer program code configured to, with the at least one processor, cause the apparatus at least to:

transmit a request message for at least one peripheral function associated with a peripheral device, from a plurality of available peripheral functions associated with one or more peripheral devices, to a wireless docking center device;

receive an allocation for the requested peripheral function associated with a peripheral device, from the wireless docking center device in response to the request message; and receive a change notification indicating that at least one of the available peripheral functions associated with one or more peripheral devices, is no longer available in response to allocation of said at least one peripheral function associated with one or more peripheral devices, to a second wireless dockee device.

15. The apparatus of claim 14, wherein the transmitted request message for available peripheral functions includes information characterizing capabilities and/or interests regarding the apparatus.

* * * * *